United States Patent
Wang et al.

(10) Patent No.: US 11,510,213 B2
(45) Date of Patent: Nov. 22, 2022

(54) METHOD FOR SIGNAL TRANSMISSION, AND CORRESPONDING USER TERMINALS AND BASE STATIONS

(71) Applicant: NTT DOCOMO, INC., Tokyo (JP)

(72) Inventors: Xin Wang, Beijing (CN); Min Liu, Beijing (CN); Jing Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 19 days.

(21) Appl. No.: 17/047,934

(22) PCT Filed: May 29, 2018

(86) PCT No.: PCT/CN2018/088879
§ 371 (c)(1),
(2) Date: Oct. 15, 2020

(87) PCT Pub. No.: WO2019/227312
PCT Pub. Date: Dec. 5, 2019

(65) Prior Publication Data
US 2021/0168818 A1  Jun. 3, 2021

(51) Int. Cl.
*H04W 72/08* (2009.01)
*H04B 7/0452* (2017.01)
*H04L 5/00* (2006.01)

(52) U.S. Cl.
CPC ........ *H04W 72/082* (2013.01); *H04B 7/0452* (2013.01); *H04L 5/0051* (2013.01)

(58) Field of Classification Search
CPC ... H04W 72/082; H04B 7/0452; H04B 7/088; H04L 5/0051; H04L 25/0204;
(Continued)

(56) References Cited

U.S. PATENT DOCUMENTS

2012/0077511 A1* 3/2012 Shin .................. H04B 7/022
455/422.1
2017/0127296 A1 5/2017 Gustafsson et al.
(Continued)

FOREIGN PATENT DOCUMENTS

| CN | 106664124 A | 5/2017 |
|---|---|---|
| CN | 108024274 A | 5/2018 |
| WO | 2016/086144 A1 | 6/2016 |

OTHER PUBLICATIONS

International Search Report issued in PCT/CN2018/088879 dated Mar. 6, 2019 (2 pages).

*Primary Examiner* — Vineeta S Panwalkar
(74) *Attorney, Agent, or Firm* — Osha Bergman Watanabe & Burton LLP

(57) ABSTRACT

Provided by the present disclosure are a method used for signal transmission, and corresponding user terminals and base stations. The method performed by a user terminal includes: receiving indication information for a spatial-domain reception parameter transmitted by a base station; determining a first spatial-domain reception parameter according to the indication information for a spatial-domain reception parameter, so that the user terminal receives downlink data signals through the first spatial domain reception parameter. The method performed by a base station includes: generating indication information for a spatial-domain reception parameter; and transmitting the indication information for a spatial-domain reception parameter to a user terminal, so that the user terminal determines a first spatial-domain reception parameter according to the indication information for a spatial-domain reception parameter.

7 Claims, 10 Drawing Sheets

(58) Field of Classification Search
CPC . H04L 25/0224; H04L 5/0048; H04L 5/0092; H04L 5/001; H04L 5/0023; H04L 1/00
See application file for complete search history.

(56) References Cited

U.S. PATENT DOCUMENTS

| | | |
|---|---|---|
| 2019/0260425 A1 | 8/2019 | Ji et al. |
| 2020/0091978 A1* | 3/2020 | Noh ................ H04B 7/0822 |

* cited by examiner

METHOD FOR SIGNAL TRANSMISSION, AND CORRESPONDING USER TERMINALS AND BASE STATIONS

TECHNICAL FIELD

The present disclosure relates to a field of mobile communication, and more particularly to a method for signal transmission and corresponding user terminals and base stations.

BACKGROUND

In order to improve channel capacity of communication systems, a Multiple Input Multiple Output (MIMO) technology has been proposed. In the MIMO technology, a base station and a user terminal respectively use a plurality of transmitting antennas and receiving antennas to transmit a plurality of data streams in parallel, thereby increasing capacity of a communication system without increasing bandwidth. According to the number of user terminals communicating with the base station simultaneously, MIMO may be divided into Single User (SU) MIMO and Multiple User (MU) MIMO. SU-MIMO means that the base station transmits a plurality of data streams in parallel with only one user, and MU-MIMO means that the base station transmits a plurality of data streams in parallel with a plurality of users.

In the existing MU-MIMO, in order to eliminate mutual interference between various users, a technology for precoding data streams has been proposed. In the precoding technology, the base station determines an equivalent channel by performing channel estimation, precodes data streams through the equivalent channel to eliminate multi-user interference in advance, and then transmits the precoded signal to the user terminal. Accordingly, the user terminal determines a precoding matrix for processing the received signal by performing channel estimation, so that the user terminal obtains a signal that does not contain multi-user interference. However, since results of the channel estimations by the base station and the user terminal are not completely the same, the precoding matrix determined by the user terminal may not match the equivalent channel determined by the base station, with the result that the signal received by the user terminal is a signal suffering strong interference.

SUMMARY OF THE DISCLOSURE

According to one aspect of the present disclosure, a method for signal transmission performed by a user terminal is provided. The method comprises: receiving indication information for a spatial-domain reception parameter transmitted by a base station; and determining a first spatial-domain reception parameter according to the indication information for a spatial-domain reception parameter, so that the user terminal receives downlink data signals through the first spatial-domain reception parameter.

According to another aspect of the present disclosure, a method for signal transmission performed by a base station is provided. The method comprises: generating indication information for a spatial-domain reception parameter; and transmitting the indication information for a spatial-domain reception parameter to a user terminal, so that the user terminal determines a first spatial-domain reception parameter according to the indication information for a spatial-domain reception parameter.

According to another aspect of the present disclosure, a method for signal transmission performed by a user terminal is provided. The method comprises: receiving information on a first antenna port from a base station; determining the first antenna port from at least one antenna port of the user terminal according to the information on the first antenna port; and receiving a first downlink data signal on the first antenna port, and ignoring a second downlink data signal received on an antenna port of the at least one antenna port except the first antenna port.

According to another aspect of the present disclosure, a method for signal transmission performed by a base station is provided. The method comprises: determining a first antenna port from at least one antenna port of a user terminal; and transmitting information on the first antenna port to the user terminal, so that the user terminal receives a first downlink data signal on the first antenna port and ignores a second downlink data signal received on an antenna port of the at least one antenna port except the first antenna port.

According to another aspect of the present disclosure, a user terminal for signal transmission is provided. The user terminal comprises: a receiving unit configured to receive indication information for a spatial-domain reception parameter transmitted by a base station; and a determining unit configured to determine a first spatial-domain reception parameter according to the indication information for a spatial-domain reception parameter, so that the user terminal receives downlink data signals through the first spatial-domain reception parameter.

According to another aspect of the present disclosure, a base station for signal transmission is provided. The base station comprises: a generating unit configured to generate indication information for a spatial-domain reception parameter; and a transmitting unit configured to transmit the indication information for a spatial-domain reception parameter to a user terminal, so that the user terminal determines a first spatial-domain reception parameter according to the indication information for a spatial-domain reception parameter.

According to another aspect of the present disclosure, a user terminal for signal transmission is provided. The user terminal comprises: a receiving unit configured to receive information on a first antenna port from a base station; a determining unit configured to determine the first antenna port from at least one antenna port of the user terminal according to the information on the first antenna port; and the receiving unit further configured to receive a first downlink data signal on the first antenna port, and ignore a second downlink data signal received on an antenna port of the at least one antenna port except the first antenna port.

According to another aspect of the present disclosure, a base station for signal transmission is provided. The base station comprises: a determining unit configured to determine a first antenna port from at least one antenna port of a user terminal; and a transmitting unit configured to transmit information on the first antenna port to the user terminal, so that the user terminal receives a first downlink data signal on the first antenna port and ignores a second downlink data signal received on an antenna port of the at least one antenna port except the first antenna port.

BRIEF DESCRIPTION OF THE DRAWINGS

The above and other objects, features and advantages of the present disclosure will become clearer by describing embodiments of the present disclosure in details in conjunction with accompanying drawings. The accompanying drawings are used to provide a further understanding of the embodiments of the present disclosure, constitute a part of this specification, and explain the present disclosure together with the embodiments of the present disclosure, but do not constitute a limitation on the present disclosure. In the accompanying drawings, like reference numerals usually represent like components or steps.

DESCRIPTION OF THE EMBODIMENTS

Figure 1:
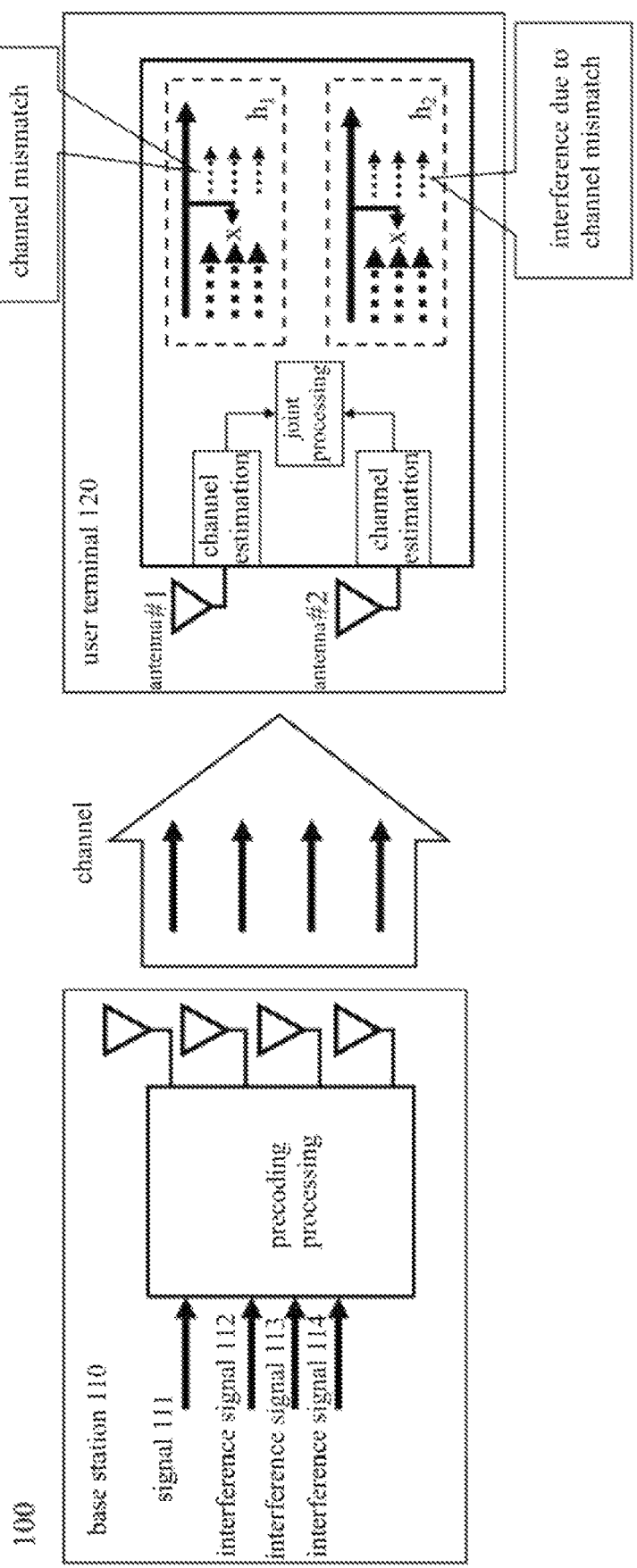
FIG. 1 is a schematic diagram of a wireless communication system in which the embodiments of the present disclosure may be applied.

In order to make objectives, technical solutions and advantages of the present disclosure clearer, exemplary embodiments according to the present disclosure will be described in detail below with reference to the accompanying drawings. Like reference numerals refer to like elements throughout the accompanying drawings. It should be understood that the embodiments described herein are merely illustrative and should not be construed as limiting the scope of the present disclosure. Furthermore, the User Equipment (UE) described herein may include various types of user terminals, for example, a mobile terminal (or referred to as a mobile station) or a fixed terminal. However, for convenience, the UE and the mobile station sometimes may be used interchangeably hereinafter. In addition, the base station may be a fixed station, a NodeB, an eNodeB (eNB), an access point, a transmission point, a reception point, a femto cell, a small cell and the like which is not limited herein.

First, a schematic diagram of a wireless communication system in which the embodiments of the present disclosure may be applied will be described with reference to FIG. 1. The wireless communication system may be an LTE system, an LTE-A system, an NR system, or any other type of wireless communication system. Hereinafter, a 5G NR system is taken as an example to describe the embodiments of the present disclosure, but it should be appreciated that the following description may also be applied to other types of wireless communication systems.

As shown in FIG. 1, the wireless communication system 100 may include a base station (BS) 110 and a user terminal 120, and the base station 110 is a serving base station of the user terminal 120. The base station 110 determines an equivalent channel for transmitting a signal to the user terminal 120 based on estimation of a downlink channel, and performs, by using the equivalent channel, precoding processing on a signal 111 (also referred to as a "signal flow", a "data flow", a "signal layer", etc.) to be transmitted to the user terminal 120 and interference signals 112 to 114 suffered by the user terminal 120 (for example, signals to be transmitted by the base station to other user terminals). Then, the base station 110 transmits the signals after precoding processing to the user terminal 120 on the downlink channel. Accordingly, the user terminal 120 receives the signals after precoding processing via antenna #1 and antenna #2, respectively, and estimates channels corresponding to antenna #1 and antenna #2 to determine a precoding matrix for reception. Then, the user terminal 120 processes the two signals from antenna #1 and antenna #2 by the precoding matrix. Since a transmitter of the base station 110 and a receiver of the user terminal 120 (e.g., an MIMO receiver) are transparent to each other, a result of channel estimation by the transmitter of the base station 110 and a result of channel estimation by the receiver of the user terminal 120 are not completely the same. In this case, the precoding matrix determined by the user terminal 120 for reception does not match the equivalent channel determined by the base station 110, with the result that the signal received by the user terminal is a signal suffering strong interference. In order to reduce interference suffered by the user terminal, the technical solution of the present disclosure is proposed.

It should be appreciated that although one base station and one user terminal are shown in FIG. 1 and the user terminal has two antennas, this is only illustrative, and the wireless communication system may further include more base stations and/or more user terminals, and/or the user terminal may have fewer or more antennas.

In the present disclosure, the precoding matrix for reception at the user terminal side may also be referred to as a reception matrix, a reception vector, a reception beamforming vector, a reception precoding matrix, a reception precoding vector, a spatial filter, a reception spatial filter, a spatial reception parameter, a spatial reception vector, a spatial reception matrix, a spatial reception filter, a spatial-domain reception parameter, a spatial-domain reception vector, a spatial-domain reception matrix, a spatial-domain reception filter and the like. Hereinafter, the above terms may be used interchangeably for convenience.

According to one embodiment of the present disclosure, the user terminal may determine a spatial-domain reception parameter according to indication information for a spatial-domain reception parameter transmitted by the base station. This embodiment will be described below in conjunction with FIGS. 2-4.

Figure 2:
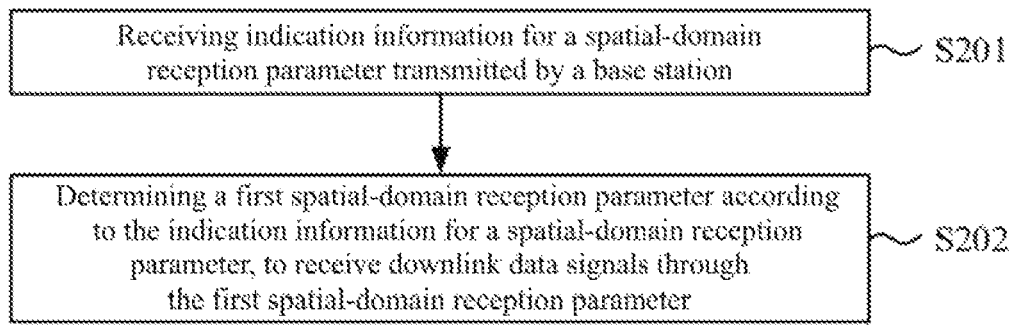
FIG. 2 is a flowchart of a method for signal transmission performed by a user terminal according to one embodiment of the present disclosure.

First, a method for signal transmission performed by a user terminal according to one embodiment of the present disclosure will be described with reference to FIG. 2. FIG. 2 is a flowchart of a method 200 for signal transmission performed by a user terminal according to one embodiment of the present disclosure. As shown in FIG. 2, in step S201, the user terminal receives indication information for a spatial-domain reception parameter transmitted by the base station. For example, the indication information for a spatial-domain reception parameter may be indication information generated accordingly by the base station upon the user terminal notifies the base station of a spatial-domain reception parameter determined by itself. Alternatively, the indication information for a spatial-domain reception parameter may also be indication information generated by the base station according to a spatial-domain reception parameter that the base station determines for the user terminal. Then, in step S202, the user terminal determines a first spatial-domain reception parameter according to the indication information for a spatial-domain reception parameter, so that the user terminal receives downlink data signals through the first spatial-domain reception parameter.

An example where the indication information for a spatial-domain reception parameter in step S201 is indication information generated accordingly by the base station upon the user terminal notifies the base station of a spatial-domain reception parameter determined by itself will be described below specifically.

According to one example of the present disclosure, in this case, before step S201, the method 200 may further include: determining, by the user terminal, at least one candidate spatial-domain reception parameter by measuring a downlink channel. For example, the user terminal may receive a downlink reference signal from the base station, such as a Channel State Information Reference Signal (CSI-RS), for measurement of downlink information to train spatial-domain reception parameters, thereby determining one or more candidate spatial-domain reception parameters.

Alternatively, in this case, before step S201, the method 200 may further include: selecting, by the user terminal, at least one candidate spatial-domain reception parameter from a codebook. The "codebook" herein may be a preset codebook corresponding to spatial-domain reception parameters. For example, the codebook may be configured by the base station, and notified to the user terminal by the base station. For another example, the codebook may be a codebook agreed by a standard specification (such as 3GPP) and stored by both the user terminal and the base station in advance.

After the user terminal determines one or more candidate spatial-domain reception parameters, the method 200 may further include: transmitting, by the user terminal, uplink reference signals to the base station, respectively, by using the at least one candidate spatial-domain reception parameter, so that the base station determines a first reference signal from at least one uplink reference signal. In this example, the uplink reference signals may be any type of uplink reference signals, such as Sounding Reference Signals (SRSs).

For example, after receiving trigger information for uplink reference signals transmitted by the base station, the user terminal may transmit one uplink reference signal to the base station by using one candidate spatial-domain reception parameter, so that the base station determines the uplink reference signal as the first reference signal after receiving the uplink reference signal and transmits information on the first reference signal to the user terminal.

For another example, after receiving the trigger information for uplink reference signals transmitted by the base station, the user terminal may transmit a plurality of uplink reference signals to the base station, respectively, by using a plurality of candidate spatial-domain reception parameters, so that the base station selects one uplink reference signal from the plurality of uplink reference signals and determined it as the first reference signal after receiving the plurality of uplink reference signals. In addition, the base station may also generate indication information for a spatial-domain reception parameter according to the first reference signal.

In this example, the indication information for a spatial-domain reception parameter may include the information on the first reference signal. Accordingly, in step S201, the user terminal may receive the information on the first reference signal. Then, in step S202, the user terminal may determine a spatial-domain reception parameter used when transmitting the first reference signal according to the information on the first reference signal transmitted by the base station, and determine the spatial-domain reception parameter used when transmitting the first reference signal as the first spatial-domain reception parameter for receiving downlink data signals.

In addition, regarding the "information on the first reference signal" in the above example, according to one example of the present disclosure, the information on the first reference signal may include resource information and/or port information (e.g., port indexes) of the first reference signal. The resource information of the first reference signal may be, for example, a resource identifier (ID) used when the user terminal transmits an uplink reference signal to be determined by the base station as the first reference signal, such as a time-frequency resource ID. For example, when transmitting an uplink reference signal to the base station, the user terminal may transmit the resource ID and/or port information of the uplink reference signal to the base station together, so that the base station may feedback, after determining the uplink reference signal as the first reference signal, the resource ID and/or port information of the first reference signal to the user terminal. Therefore, after receiving the resource ID and/or port information of the first reference signal fed back by the base station, the user terminal may determine a spatial-domain reception parameter used when transmitting the first reference signal as a target spatial-domain reception parameter.

According to another example of the present disclosure, the information on the first reference signal may further include correlation information between the first reference signal and the downlink reference signal. The "downlink reference signal" herein may be any type of downlink reference signal, such as a Demodulation Reference Signal (DM-RS).

In this example, the correlation information between the first reference signal and the downlink reference signal may be included in downlink configuration information received by the user terminal from the base station. The downlink configuration information may be, for example, downlink Transmission Configuration Identification or Quasi Co-Location (QCL) configuration information. For example, the correlation information between the first reference signal and the downlink reference signal may be embodied as adding the resource information and/or port information of the first reference signal to the downlink configuration information, thereby indicating correlation between the first reference signal and the downlink reference signal. Therefore, the user terminal may learn the first reference signal determined by the base station for the user terminal through the downlink configuration information, and then determine a spatial-domain reception parameter used when transmitting the first reference signal as the target spatial-domain reception parameter. The downlink configuration information being QCL configuration information will be taken as an example to describe the present disclosure.

For example, the resource information and/or port information of the first reference signal may be added to conventional QCL configuration information. The conventional QCL configuration information already includes information indicating correlation between a CSI-RS, a Synchronization Signal (SS) block or the like and the downlink reference signal. In this example, the resource ID and/or port information of the first reference signal may be added to the conventional QCL configuration information to indicate the correlation between the first reference signal and the downlink reference signal. An example of the QCL configuration information is given below:

```
QCL-Info ::= SEQUENCE {
        ...
        referenceSIgnal CHOICE {
           ......
           srs   SRS-ResourceId,
        }
}
```

In this example, the QCL configuration information may be abbreviated as "QCL-Info". In addition, a type of the QCL configuration information may be the Type-D (Type-D) defined in existing standard specifications, that is, a spatial-domain reception parameter used for transmission configuration indication for the resource information and/or port information of the first reference signal.

For another example, a new type of QCL configuration information that is different from the conventional QCL configuration information may be designed. The new type of QCL configuration information may only indicate the correlation between the first reference signal and the downlink reference signal, but not indicate correlation between a CSI-RS, a SS block or the like and the downlink reference signal. For example, the new type of QCL configuration information may include the resource information and/or port information of the first reference signal to indicate the correlation between the first reference signal and the downlink reference signal. An example of the new type of QCL configuration information is given below:

```
QCL-UL-Info ::= SEQUENCE {
      cell    ServCellIndex
      bwp-Id BWP-Id
      referenceSignal CHOICE {
         srs   SRS-ResourceId,
   },
   qcl-Type      ENUMERATED {typeA, typeB, typeC, typeD},
}
```

In this example, the new type of QCL configuration information may be abbreviated as "QCL-UL-Info". In addition, the type of the QCL configuration information may be any of the type A (Type-A), type B (Type-B), type C (Type-C) or type D (Type-D) defined in existing standard specifications.

With the above conventional QCL configuration information or newly designed QCL configuration information, the user terminal may determine that the first reference signal is correlated with the downlink reference signal, and then may determine a spatial-domain reception parameter used when transmitting the first reference signal as the first spatial-domain reception parameter for receiving downlink data signals.

It should be appreciated that the above conventional QCL configuration information or newly designed QCL configuration information may further include other information in addition to information indicating correlation between a certain signal and the downlink reference signal, and such other information is omitted herein since it is irrelevant to the present disclosure.

In addition, according to one example of the present disclosure, the user terminal may receive the downlink configuration information through Radio Resource Control (RRC) signaling, Downlink Control Information (DCI), Media Access Control (MAC) Control Elements (CEs) or the like from the base station, so as to determine the first spatial-domain reception parameter for receiving downlink data signals according to the downlink configuration information.

In addition, according to another example of the present disclosure, the base station may switch between the conventional QCL configuration information and the newly designed QCL configuration information. Accordingly, the user terminal may determine whether to use the conventional QCL configuration information or the newly designed QCL configuration information through RRC signaling, DCI, MAC CEs or the like from the base station, to determine the first spatial-domain reception parameter for receiving downlink data signals.

The example where the indication information for a spatial-domain reception parameter in step S201 is indication information generated accordingly by the base station upon the user terminal notifies the base station of a spatial-domain reception parameter determined by itself has been described above. An example where the indication information for a spatial-domain reception parameter in step S201 is indication information generated by the base station according to a spatial-domain reception parameter that the base station determines for the user terminal will be described below specifically.

According to one example of the present disclosure, in this case, the "indication information for a spatial-domain reception parameter" in step S201 may include index information for the first spatial-domain reception parameter. Accordingly, in step S202, the user terminal may determine the first spatial-domain reception parameter for receiving downlink data signals according to the received index information for the first spatial-domain reception parameter. For example, the user terminal may determine the first spatial-domain reception parameter from the preset codebook according to the index information for the first spatial-domain reception parameter.

For example, both the user terminal and the base station may store a codebook corresponding to spatial-domain reception parameters in advance, and then the base station may select the first spatial-domain reception parameter from the codebook and transmit index information for the first spatial-domain reception parameter to the user terminal. The "codebook" may be, for example, any codebook corresponding to spatial-domain reception parameters, such as a codebook already defined in Release 8 or other versions of 3GPP. Accordingly, in step S201, the user terminal receives the index information for the first spatial-domain reception parameter transmitted by the base station. Then, in step S202, the user terminal may determine the first spatial-domain reception parameter for receiving downlink data signals in the codebook according to the index information.

In this example, the codebook may be used to quantize spatial-domain reception parameters. For example, for user terminals with different numbers of antenna ports, different codebooks may be set respectively. For example, for user terminals having two antenna ports, four antenna ports, and eight antenna ports, three codebooks represented by four bits may be set.

In addition, according to one example of the present disclosure, the index information for the first spatial-domain reception parameter may be transmitted to the user terminal by the base station through RRC signaling, DCI, MAC CEs or the like. Accordingly, the user terminal may obtain the index information for the first spatial-domain reception parameter by receiving the RRC signaling, the DCI, the MAC CEs or the like from the base station, so as to determine the first spatial-domain reception parameter for receiving downlink data signals in the codebook according to the index information for the first spatial-domain reception parameter.

The above example describes that, when the indication information for a spatial-domain reception parameter in step S201 is indication information generated by the base station according to a spatial-domain reception parameter that the base station determines for the user terminal, the "indication information for a spatial-domain reception parameter" in step S201 may include the index information for the first spatial-domain reception parameter. That is, the user terminal may be notified of the first spatial-domain reception parameter by the base station in an implicit manner. In addition, according to another example of the present disclosure, the user terminal may also be notified of the first spatial-domain reception parameter by the base station in an explicit manner.

For example, when the indication information for a spatial-domain reception parameter in step S201 is indication information generated by the base station according to a spatial-domain reception parameter that the base station determines for the user terminal, the "indication information for a spatial-domain reception parameter" in step S201 may further include the first spatial-domain reception parameter. Accordingly, in step S202, the user terminal may quickly determine the first spatial-domain reception parameter for receiving downlink data signals according to the received first spatial-domain reception parameter.

With the above embodiment of the present disclosure, the base station may indicate the user terminal to determine a spatial filter for receiving downlink data signals, so that both the base station and the user terminal may agree on the spatial filter for receiving downlink data signals, ensuring that the spatial filter for receiving downlink data signals matches an equivalent channel determined by the base station, thereby reducing interference suffered by the user terminal.

Figure 3:
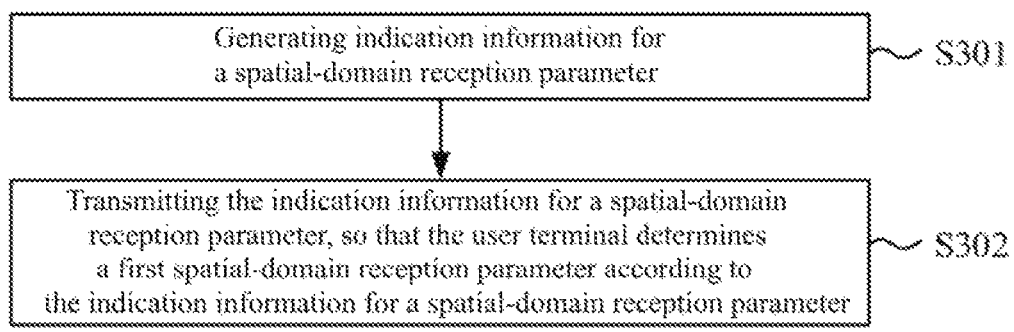
FIG. 3 is a flowchart of a method for signal transmission performed by a base station according to one embodiment of the present disclosure.

A method for signal transmission performed by a base station according to one embodiment of the present disclosure will be described below with reference to FIG. 3. FIG. 3 is a flowchart of a method 300 for signal transmission method 300 performed by a base station according to one embodiment of the present disclosure. Since some details of the method 300 is the same as that of the method 200 described above with reference to FIG. 2, a detailed description of the same content is omitted herein for simplicity. As shown in FIG. 3, in step S301, the base station generates indication information for a spatial-domain reception parameter. For example, the indication information for a spatial-domain reception parameter may be indication information generated accordingly by the base station upon the user terminal notifies the base station of a spatial-domain reception parameter determined by itself. Alternatively, the indication information for a spatial-domain reception parameter may also be indication information generated by the base station according to a spatial-domain reception parameter that the base station determines for the user terminal.

An example where the indication information for a spatial-domain reception parameter in step S301 is indication information generated accordingly by the base station upon the user terminal notifies the base station of a spatial-domain reception parameter determined by itself will be described below specifically.

According to one example of the present disclosure, in this case, before step S301, the method 300 may further include: receiving, by the base station, at least one uplink reference signal from the user terminal, the at least one uplink reference signal being transmitted by the user terminal to the base station, respectively, by using at least one candidate spatial-domain reception parameter; and selecting, by the base station, a first reference signal from the at least one uplink reference signal. For example, the base station may select the first reference signal according to reception quality of the at least one uplink reference signal, for example, the base station may determine an uplink reference signal with the best reception quality as the first reference signal.

In this example, after selecting the first reference signal, the base station may determine, according to the first reference signal, an equivalent channel for transmitting downlink data signals to the user terminal. Moreover, the base station may generate the indication information for a spatial-domain reception parameter according to information of the first reference signal, and transmit the indication information for a spatial-domain reception parameter to the user terminal. For example, the indication information for a spatial-domain reception parameter may include information on the first reference signal. Accordingly, the user terminal may determine a first spatial-domain reception parameter for receiving downlink data signals according to the indication information for a spatial-domain reception parameter. In this way, a spatial filter of the user terminal for receiving downlink data signals matches the equivalent channel determined by the base station, so that the signal received by the user terminal is a signal that suffers less interference or a signal that does not suffer interference.

In addition, regarding the "information on the first reference signal" in the above example, according to one example of the present disclosure, the information on the first reference signal may include resource information and/or port information (e.g., port indexes) of the first reference signal. The resource information of the first reference signal may be, for example, a resource identifier (ID) used when the user terminal transmits an uplink reference signal to be determined by the base station as the first reference signal, such as a time-frequency resource ID. For example, when transmitting an uplink reference signal to the base station, the user terminal may transmit the resource ID and/or port information of the uplink reference signal to the base station together, so that the base station may feedback, after determining the uplink reference signal as the first reference signal, the resource ID and/or port information of the first reference signal to the user terminal. Therefore, after receiving the resource ID and/or port information of the first reference signal fed back by the base station, the user terminal may determine a spatial-domain reception parameter used when transmitting the first reference signal as a target spatial-domain reception parameter.

According to another example of the present disclosure, the information on the first reference signal may further include correlation information between the first reference signal and a downlink reference signal. The "downlink reference signal" herein may be any type of downlink reference signal, such as a Demodulation Reference Signal (DM-RS).

In this example, the correlation information between the first reference signal and the downlink reference signal may be included in downlink configuration information received by the user terminal from the base station. The downlink configuration information may be, for example, downlink Transmission Configuration Identification or Quasi Co-Location (QCL) configuration information. For example, the correlation information between the first reference signal and the downlink reference signal may be embodied as adding the resource information and/or port information of the first reference signal to the downlink configuration information, thereby indicating correlation between the first reference signal and the downlink reference signal. Therefore, the user terminal may learn the first reference signal determined by the base station for the user terminal through the downlink configuration information, and then determine the spatial-domain reception parameter used when transmitting the first reference signal as the target spatial-domain reception parameter.

The example where the indication information for a spatial-domain reception parameter in step S301 is indication information generated accordingly by the base station upon the user terminal notifies the base station of a spatial-domain reception parameter determined by itself has been described above. An example where the indication information for a spatial-domain reception parameter in step S301 is indication information generated by the base station according to a spatial-domain reception parameter that the base station determines for the user terminal will be described below specifically.

According to one example of the present disclosure, in this case, the "indication information for a spatial-domain reception parameter" in step 301 may include index information for the first spatial-domain reception parameter. That is, the user terminal may be notified of the first spatial-domain reception parameter by the base station in an implicit manner.

In addition, according to another example of the present disclosure, the user terminal may also be notified of the first spatial-domain reception parameter by the base station in an explicit manner. For example, when the indication information for a spatial-domain reception parameter in step 301 is indication information generated by the base station according to a spatial-domain reception parameter that the base station determines for the user terminal, the "indication information for a spatial-domain reception parameter" in step S301 may further include the first spatial-domain reception parameter. Accordingly, the user terminal may quickly determine the first spatial-domain reception parameter for receiving downlink data signals according to the received first spatial-domain reception parameter.

Then, in step S302, the base station transmits the indication information for a spatial-domain reception parameter to the user terminal, so that the user terminal determines the first spatial-domain reception parameter according to the indication information for a spatial-domain reception parameter. For example, the base station may transmit the indication information for a spatial-domain reception parameter to the user terminal through RRC signaling, DCI, MAC CEs or the like. Accordingly, the user terminal may obtain the index information for the first spatial-domain reception parameter by receiving the RRC signaling, the DCI, the MAC CEs or the like from the base station, so as to determine the first spatial-domain reception parameter for receiving downlink data signals in the codebook according to the index information for the first spatial-domain reception parameter.

In addition, according to one example of the present disclosure, the method 300 may further include: performing, by the base station, precoding processing on downlink data signals, and transmitting the downlink data signals after precoding processing to the user terminal. For example, the base station may perform non-linear precoding processing on the downlink data signals, for example, by using the Tomlinson-Harashima Precoding (THP) scheme or the Vector Perturbation (VP) scheme. A process of the base station performing non-linear precoding processing on the downlink data signals may be described below by taking THP as an example.

Assume that in a communication system, there are 1 base station and K user terminals, where each user terminal has $N_{RX,k}$ antenna ports. For the k-th user terminal, the number of layers scheduled by the base station for the k-th user terminal is $L_k$, where k≤K and is a positive integer. In addition, for the k-th user terminal, a data symbol of the l-th layer scheduled for the k-th user terminal is $d_{k,l}$ (l=1, . . . , $L_k$). In addition, an element of a feedback matrix B corresponding to interference of the n-th layer of the m-th user terminal to the l-th layer of the k-th user terminal is $b_{k,l}$. Therefore, for the k-th user terminal, taking $L_k$=1 as an example, THP precoding processing is implemented by the following formula (1) to obtain a data symbol $x'_{k,l}$ after preprocessing:

$$x'_{k,l}=d_{k,l}+2\sqrt{\alpha}(p_I+jp_Q)-\Sigma_{l=1}^{k-1}b_{k,l}x'_{k,l} \quad \text{Formula (1)}$$

where α is a modulus boundary, $p_I$, $p_Q$ are integers, and $\Sigma_{l=1}^{k-1}b_{k,l}x'_{k,l}$ represents interference to the k-th layer by the first layer to the (k−1)-th layer.

With the above embodiment of the present disclosure, the base station may indicate the user terminal to determine a spatial filter for receiving downlink data signals, so that both the base station and the user terminal may agree on the spatial filter for receiving downlink data signals, ensuring that the spatial filter for receiving downlink data signals matches the equivalent channel determined by the base station, thereby reducing interference suffered by the user terminal.

Figure 4:
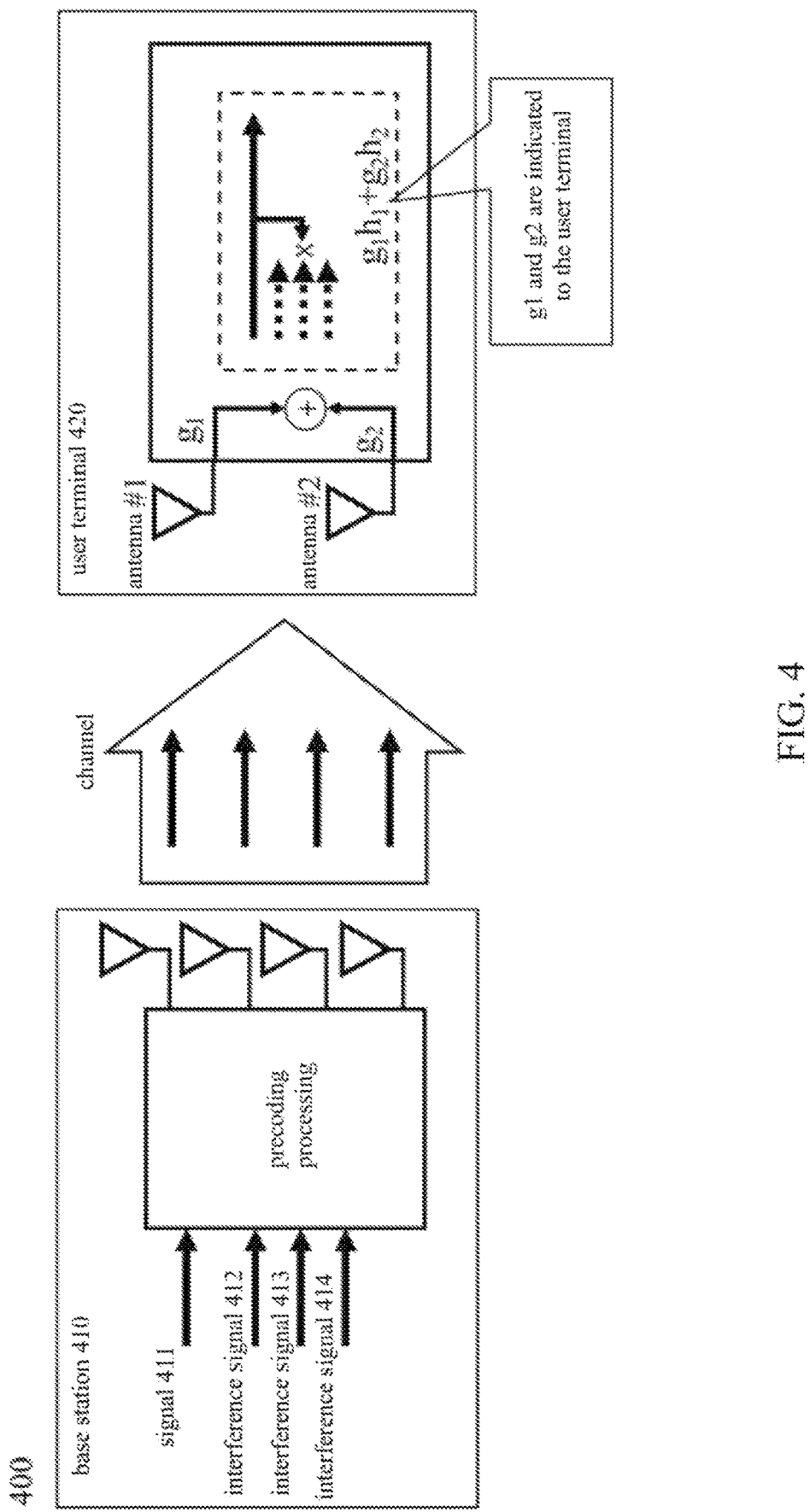
FIG. 4 is a schematic diagram of a wireless communication system that performs signal transmission according to the methods shown in FIGS. 2 and 3.

In addition, a schematic diagram of a wireless communication system that performs signal transmission according to the method 200 shown in FIG. 2 and the method 300 shown in FIG. 3 may be described with reference to FIG. 4. As shown in FIG. 4, a wireless communication system 400 may include a base station (B S) 410 and a user terminal 420, where the base station 410 is a serving base station of the user terminal 420. Unlike the prior art (for example, the wireless communication system shown in FIG. 1), since the base station 410 transmits indication information for a spatial-domain reception parameter (which, for example, may be represented by a vector [$g_1$, $g_2$]) to the user terminal 420, the user terminal 420 may determine a first spatial-domain reception parameter for receiving downlink data signals according to the indication information for a spatial-domain reception parameter, so that a spatial filter for receiving downlink data signals of the user terminal 420 matches an equivalent channel (which, for example, may be represented by a vector [$h_1$, $h_2$]) determined by the base station 410. As shown in FIG. 4, the user terminal 420 may process two signals from antenna #1 and antenna #2 through the first spatial-domain reception parameter, thereby reducing interference suffered by the user terminal.

According to another embodiment of the present disclosure, the user terminal may receive downlink data signals on one or more antenna ports indicated by the base station and ignore downlink data signals received on other antenna ports except the one or more antenna ports. The embodiment will be described below with reference to FIGS. 5-7.

Figure 5:
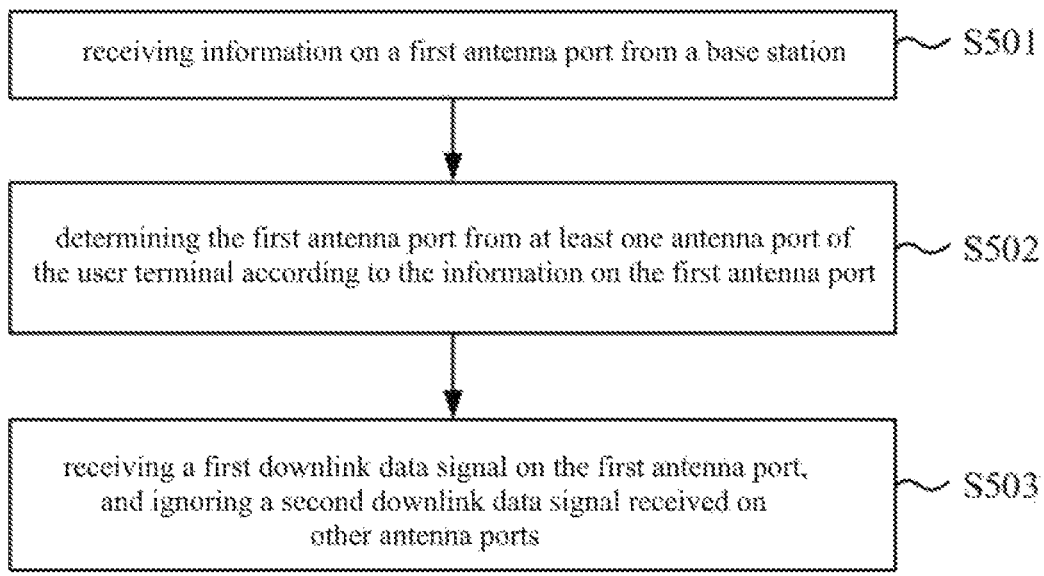
FIG. 5 is a flowchart of a method for signal transmission performed by a user terminal according to another embodiment of the present disclosure.

First, a method for signal transmission performed by a user terminal according to another embodiment of the present disclosure will be described with reference to FIG. 5. FIG. 5 is a flowchart of a method 500 for signal transmission performed by a user terminal according to another embodiment of the present disclosure. As shown in FIG. 5, in step S501, the user terminal receives information on a first antenna port from a base station. The "antenna port" herein may be an uplink port of the user terminal, for example, a port in SRS resources, or may be other equivalent concept, for example, one SRS resource in a set of single-port SRS resources.

According to one example of the present disclosure, the first antenna port may be determined by the base station from at least one antenna port of the user terminal. For example, the first antenna port may be determined by: the user terminal transmitting an uplink reference signal, such as an SRS, to the base station, and then the base station determining channel conditions corresponding to the at least one antenna port of the user terminal according to the received SRS and determining the first antenna port from the at least one antenna port of the user terminal according to the channel conditions. For example, the first antenna port may be determined by the base station by comparing channel conditions corresponding to respective antenna ports of the user terminal, and selecting an antenna port with the best channel condition.

According to one example of the present disclosure, the information on the first antenna port may include index information for the first antenna port. For example, both the user terminal and the base station may store an antenna port selection codebook in advance, and then the base station may select the first antenna port from the antenna port selection codebook, and transmit the index information for the first antenna port to the user terminal. Accordingly, after receiving the index information for the first antenna port, the user terminal may determine the first antenna port in the antenna port selection codebook according to the index information.

In this example, for a user terminal having a specific number of antenna ports, one or more codebooks corresponding to the specific number of antenna ports may be set. In addition, the number of bits of the one or more codebooks may be determined according to the specific number of antenna ports of the user terminal.

For example, one codebook and the number of bits of the one codebook may be determined according to the specific number of antenna ports and RI values of the user terminal. For example, one codebook may be set for all RI (Rank Indication) values. For a user terminal having two antenna ports, the user terminal may receive downlink data signals by using at least one of the two antenna ports. Then, when RI is 1, the user terminal may receive downlink data signals by using any one of the two antenna ports (two usage modes of the ports); and when RI is 2, the user terminal may receive downlink data signals by using the two antenna ports (one usage mode of the ports). Therefore, there are three usage modes of the ports for the user terminal having two antenna ports, and one antenna port selection codebook represented by two bits may be set accordingly.

For another example, a plurality of codebooks and the number of bits in each codebook of the plurality of codebooks may be determined according to the specific number of antenna ports and the RI values of the user terminal. For example, for each RI value, one codebook corresponding to each RI value may be set. For the user terminal having two antenna ports, the user terminal may receive downlink data signals by using at least one of the two antenna ports. Then, when RI is 1, the user terminal may receive downlink data signals by using any one of the two antenna ports, and an antenna port selection codebook represented by 1 bit shown in Table 1 below may be defined. Table 1 is an example of the antenna port selection codebook when the user terminal has two antenna ports and RI is 1.

TABLE 1

| Example of the antenna port selection codebook | |
|---|---|
| Codeword No. | Meaning |
| 0 | Using antenna port 0 |
| 1 | Using antenna port 1 |

In this case, the base station may also jointly notify the user terminal of RI and index information for the antenna ports (or antenna port selection codewords). For example, the base station may define joint notification signaling represented by 2 bits shown in Table 2 below. Table 2 is an example of joint notification signaling when the user terminal has two antenna ports and RI is 1 or 2.

TABLE 2

| Example of joint notification signaling | |
|---|---|
| Codeword No. | Meaning |
| 00 | RI = 1, and using antenna port 0 |
| 01 | RI = 1, and using antenna port 1 |
| 10 | RI = 2, and using antenna port 0, 1 |
| 11 | Reserved |

The above example will be described again by taking a user terminal having four antenna ports as an example. According to the above example, one or more codebooks corresponding to the specific number of antenna ports may be set.

For example, one codebook and the number of bits of the one codebook may be determined according to the specific number of antenna ports and RI values of the user terminal. For example, one codebook may be set for all RI values. For the user terminal having four antenna ports, the user terminal may receive downlink data signals by using at least one of the four antenna ports. Then, when RI is 1, the user terminal may receive downlink data signals by using any one of the four antenna ports (four usage modes of the ports); when RI is 2, the user terminal may receive downlink data signals by using any two of the four antenna ports (six usage modes of the ports); when RI is 3, the user terminal may receive downlink data signals by using any three of the four antenna ports (four usage modes of the ports); and when RI is 4, the user terminal may receive downlink data signals by using the four antenna ports (one usage mode of the ports). Therefore, there are fifteen usage modes of the ports for the user terminal having four antenna ports, and one antenna port selection codebook represented by four bits may be set accordingly.

For another example, a plurality of codebooks and the number of bits in each codebook of the plurality of codebooks may be determined according to the specific number of antenna ports and the RI values of the user terminal. For example, for each RI value, one codebook corresponding to each RI value may be set. For the user terminal having four antenna ports, the user terminal may receive downlink data signals by using at least one of the four antenna ports. Then, when RI is 1, the user terminal may receive downlink data signals by using any one of the four antenna ports, and an antenna port selection codebook represented by 2 bits shown in Table 3 below may be defined. Table 3 is an example of the antenna port selection codebook when the user terminal has four antenna ports and RI is 1.

TABLE 3

Another example of the antenna port selection codebook

| Codeword No. | Meaning |
|---|---|
| 00 | Using antenna port 0 |
| 01 | Using antenna port 1 |
| 10 | Using antenna port 2 |
| 11 | Using antenna port 3 |

When RI is 2, the user terminal may receive downlink data signals by using any two of the four antenna ports, and an antenna port selection codebook represented by 3 bits shown in Table 4 below may be defined. Table 4 is an example of the antenna port selection codebook when the user terminal has four antenna ports and RI is 2.

TABLE 4

Another example of the antenna port selection codebook

| Codeword No. | Meaning |
|---|---|
| 000 | Using antenna ports 0, 1 |
| 001 | Using antenna ports 0, 2 |
| 010 | Using antenna ports 0, 3 |
| 011 | Using antenna ports 1, 2 |
| 100 | Using antenna ports 1, 3 |
| 101 | Using antenna ports 2, 3 |
| 110~111 | Reserved |

When RI is 3, the user terminal may receive downlink data signals by using any three of the four antenna ports, and an antenna port selection codebook represented by 2 bits shown in Table 5 below may be defined. Table 5 is an example of the antenna port selection codebook when the user terminal has four antenna ports and RI is 3.

TABLE 5

Another example of the antenna port selection codebook

| Codeword No. | Meaning |
|---|---|
| 00 | Using antenna ports 0, 1, 2 |
| 01 | Using antenna ports 0, 1, 3 |
| 10 | Using antenna ports 0, 2, 3 |
| 11 | Using antenna ports 1, 2, 3 |

In this case, the base station may also jointly notify the user terminal of RI and index information for the antenna ports (or antenna port selection codewords). For example, the base station may define joint notification signaling represented by 4 bits shown in Table 6 below. Table 6 is an example of joint notification signaling when the user terminal has four antenna ports and RI is 1~4.

TABLE 6

Another example of joint notification signaling

| Bit field value | RI | Antenna port(s) |
|---|---|---|
| 0000 | 1 | Using antenna port 0 |
| 0001 | 1 | Using antenna port 1 |
| 0010 | 1 | Using antenna port 2 |
| 0011 | 1 | Using antenna port 3 |
| 0100 | 2 | Using antenna ports 0, 1 |
| 0101 | 2 | Using antenna ports 0, 2 |
| 0110 | 2 | Using antenna ports 0, 3 |
| 0111 | 2 | Using antenna ports 1, 2 |
| 1000 | 2 | Using antenna ports 1, 3 |
| 1001 | 2 | Using antenna ports 2, 3 |
| 1010 | 3 | Using antenna ports 0, 1, 2 |
| 1011 | 3 | Using antenna ports 0, 1, 3 |
| 1100 | 3 | Using antenna ports 0, 2, 3 |
| 1101 | 3 | Using antenna ports 1, 2, 3 |
| 1110 | 4 | Using antenna ports 1, 2, 3, 4 |
| 1111 | Reserved | Reserved |

In addition, an antenna port selection codebook may also be set in a similar manner for a user terminal having eight or more antenna ports. However, in order to control signaling overhead, all possible antenna port selection codebooks may not be set for each RI value.

According to another example of the present disclosure, the information on the first antenna port may include correlation information between the first antenna port and the uplink reference signal. In this example, the uplink reference signal may be any type of uplink reference signal, such as a Sounding Reference Signal (SRS). For example, the first antenna port may be set to be QCLed with an SRS port, and therefore, when the user terminal receives the correlation information, an antenna port that is QCLed with the SRS port may be determined as the first antenna port. In addition, the "correlation information between the first antenna port and the uplink reference signal" in this example may also be configured in a similar manner to the QCL configuration information described above, and then transmitted by the base station to the user terminal.

According to another example of the present disclosure, the information on the first antenna port may further include correlation information between the first antenna port and an index of the first antenna port. For example, the first antenna port may be set to be QCLed with the index of the first antenna port, and therefore, when the user terminal receives the correlation information, an antenna port that is QCLed with the index of the first antenna port may be determined as the first antenna port. In addition, the "correlation information between the first antenna port and an index of the first antenna port" in this example may also be configured in a similar manner to the QCL configuration information described above, and then transmitted by the base station to the user terminal.

In addition, according to one example of the present disclosure, the information on the first antenna port may be transmitted by the base station to the user terminal through RRC signaling, DCI, MAC CEs or the like. Accordingly, the user terminal may obtain the information on the first antenna port by receiving the RRC signaling, the DCI, the MAC CEs or the like from the base station, so that the user terminal receives downlink data signals on the first antenna port and discards downlink data signals received on antenna ports of the at least one antenna port except the first antenna port.

Then, in step S502, the user terminal determines the first antenna port from the at least one antenna port of the user terminal based on the information on the first antenna port. For example, when the information on the first antenna port is the index information for the first antenna port, after receiving the index information for the first antenna port, the user terminal may determine the first antenna port in the antenna port selection codebook according to the index information. For another example, when the information on the first antenna port is the correlation information between the first antenna port and the uplink reference signal or the index of the first antenna port, after receiving the correlation information, the user terminal may determine an antenna port correlated with the uplink reference signal or the index of the first antenna port as the first antenna port.

Then, in step S503, the user terminal receives a first downlink data signal on the first antenna port, and ignores a second downlink data signal received on an antenna port of the at least one antenna port except the first antenna port. For example, the user terminal may receive the first downlink data signal on the first antenna port and process the first downlink data signal, and the user terminal may discard the second downlink data signal received on an antenna port of the at least one antenna port except the first antenna port.

The above embodiment may be applied to the wireless communication system shown in FIG. 1. In this case, when jointly processing two signals from antenna #1 and antenna #2, the user terminal may only process the signal from antenna #1 but not process the signal from antenna #2.

In addition, the above embodiment may also be applied to the wireless communication system shown in FIG. 4. In this case, it may be understood as the base station transmitting to the user terminal indication information for a spatial-domain reception parameter, which may be represented by a vector [g1, 0] or [0, g2].

In addition, it should be appreciated that, in the above embodiment, although the user terminal receives downlink data signals on one antenna port indicated by the base station and ignores downlink data signals received on other antenna ports, the user terminal may also receive downlink data signals on a plurality of antenna ports indicated by the base station and ignores downlink data signals received on other antenna ports except the plurality of antenna ports.

With the above embodiment of the present disclosure, the base station may determine a first antenna port from at least one antenna port for the user terminal and notify the user terminal of the first antenna port, and the user terminal only processes downlink data on the first antenna port, so that the first antenna port matches an equivalent channel determined by the base station, thereby reducing interference suffered by the user terminal.

Figure 6:
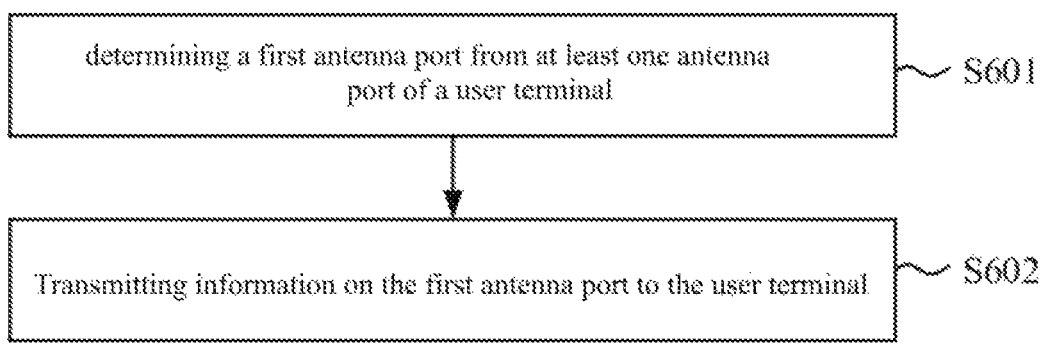
FIG. 6 is a flowchart of a method for signal transmission performed by a base station according to another embodiment of the present disclosure.

A method for signal transmission performed by a base station according to another embodiment of the present disclosure will be described below with reference to FIG. 6. FIG. 6 is a flowchart of a method 600 for signal transmission performed by a base station according to another embodiment of the present disclosure. Since some details of the method 600 is the same as that of the method 500 described above with reference to FIG. 5, a detailed description of the same content is omitted herein for simplicity. As shown in FIG. 6, in step S601, the base station determines a first antenna port from at least one antenna port of the user terminal.

According to one example of the present disclosure, the base station may determine the first antenna port from the at least one antenna port of the user terminal according to channel conditions corresponding to the at least one antenna port of the user terminal. For example, the base station may compare channel conditions corresponding to respective antenna ports of the user terminal, and select therefrom an antenna port with the best channel condition as the first antenna port.

Then, in step S602, the base station transmits information on the first antenna port to the user terminal, so that the user terminal receives a first downlink data signal on the first antenna port and ignores a second downlink data signal received on an antenna port of the at least one antenna port except the first antenna port.

According to one example of the present disclosure, the information on the first antenna port may include index information for the first antenna port. For example, both the user terminal and the base station may store an antenna port selection codebook in advance, and then the base station may select the first antenna port from the antenna port selection codebook, and transmit the index information for the first antenna port to the user terminal. Accordingly, after receiving the index information for the first antenna port, the user terminal may determine the first antenna port in the antenna port selection codebook according to the index information.

In this example, for a user terminal having a specific number of antenna ports, one or more codebooks corresponding to the specific number of antenna ports may be set. In addition, the number of bits of the one or more codebooks may be determined according to the specific number of antenna ports of the user terminal.

For example, for a user terminal having two antenna ports, the user terminal may receive downlink data signals by using at least one of the two antenna ports. When RI (Rank Indication) is 1, the user terminal may receive downlink data signals by using any one of the two antenna ports (two usage modes of the ports); and when RI is 2, the user terminal may receive downlink data signals by using the two antenna ports (one usage mode of the ports). Therefore, there are three usage modes of the ports for the user terminal having two antenna ports, and one antenna port selection codebook represented by two bits may be set.

According to another example of the present disclosure, the information on the first antenna port may include correlation information between the first antenna port and an uplink reference signal. In this example, the uplink reference signal may be any type of uplink reference signal, such as a Sounding Reference Signal (SRS). For example, the first antenna port may be set to be QCLed with an SRS port, and therefore, when the user terminal receives the correlation information, an antenna port that is QCLed with the SRS port may be determined as the first antenna port. In addition, the "correlation information between the first antenna port and an uplink reference signal" in this example may also be configured in a similar manner to the QCL configuration information described above, and then transmitted by the base station to the user terminal.

According to another example of the present disclosure, the information on the first antenna port may further include correlation information between the first antenna port and an index of the first antenna port. For example, the first antenna port may be set to be QCLed with the index of the first antenna port, and therefore, when the user terminal receives the correlation information, an antenna port that is QCLed with the index of the first antenna port may be determined as the first antenna port. In addition, the "correlation information between the first antenna port and an index of the first antenna port" in this example may also be configured in a similar manner to the QCL configuration information described above, and then transmitted by the base station to the user terminal.

In addition, according to one example of the present disclosure, the information on the first antenna port may be transmitted by the base station to the user terminal through RRC signaling, DCI, MAC CEs or the like. Accordingly, the user terminal may obtain the information on the first antenna port by receiving the RRC signaling, the DCI, the MAC CEs or the like from the base station, so that the user terminal receives the first downlink data signal on the first antenna port according to the information on the first antenna port and discards the second downlink data signal received on an antenna port of the at least one antenna port except the first antenna port.

In addition, according to one example of the present disclosure, the method 600 may further include: performing, by the base station, precoding processing on the downlink data signals, and transmitting the downlink data signals after precoding processing to the user terminal. For example, the base station may perform non-linear precoding processing on the downlink data signals, for example, by using the Tomlinson-Harashima Precoding (THP) scheme or the Vector Perturbation (VP) scheme. For example, the base station may perform THP coding on the downlink data signals by using the formula (1) described above.

With the above embodiment of the present disclosure, the base station may determine a first antenna port from at least one antenna port for the user terminal and notify the user terminal of the first antenna port, and the user terminal only processes downlink data signals on the first antenna port, so that the first antenna port matches an equivalent channel determined by the base station, thereby reducing interference suffered by the user terminal.

Figure 7:
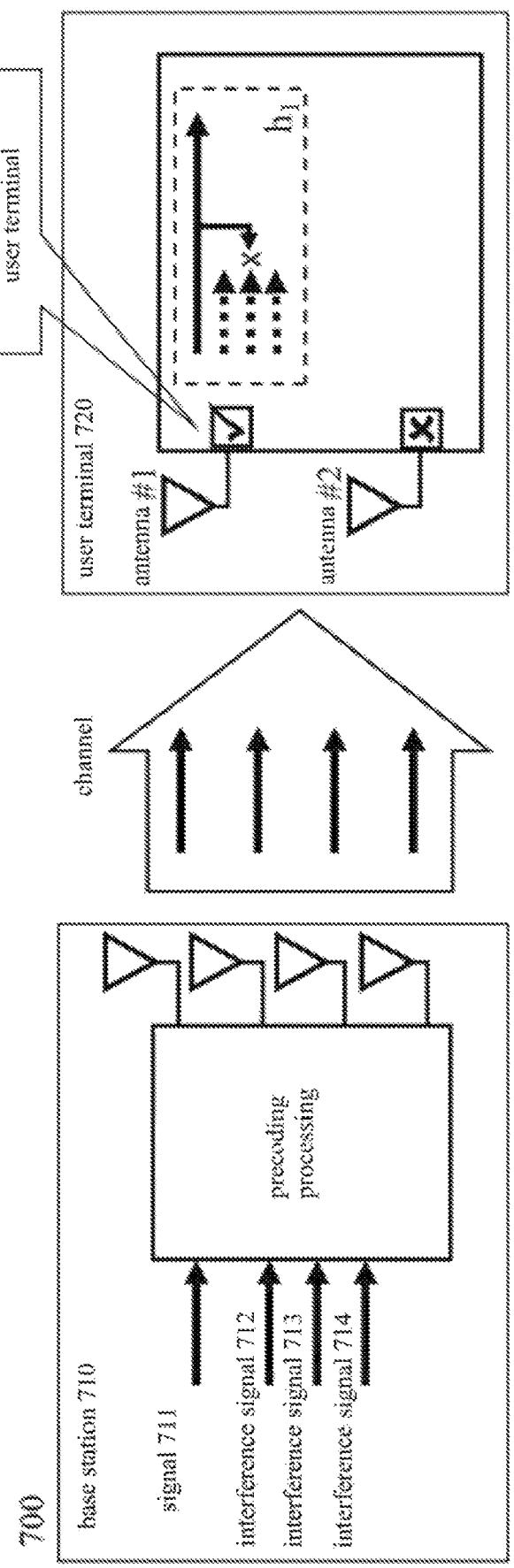
FIG. 7 is a schematic diagram of a wireless communication system that performs signal transmission according to the methods shown in FIGS. 5 and 6.

In addition, a schematic diagram of a wireless communication system that performs signal transmission according to the method 500 shown in FIG. 5 and the method 600 shown in FIG. 6 may be described with reference to FIG. 7. As shown in FIG. 7, a wireless communication system 700 may include a base station (BS) 710 and a user terminal 720, where the base station 710 is a serving base station of the user terminal 720. Unlike the prior art (for example, the wireless communication system shown in FIG. 1), since the base station 710 transmits information on a first antenna port to the user terminal 420, the user terminal 720 may receive a first downlink data signal on the first antenna port according to the information on the first antenna port and discards a second downlink data signal received on an antenna port of the at least one antenna port except the first antenna port, so that the first antenna port of the user terminal 720 matches an equivalent channel determined by the base station, thereby ensuring that signals received by the user terminal do not include interference signals from other antenna ports. As shown in FIG. 7, the user terminal 720 may receive signals via antenna #1 while discard signals received via antenna #2, thereby reducing interference suffered by the user terminal.

According to another example of the present disclosure, the user terminal may receive initial data and its replica data from the base station in order to obtain the initial data through interference cancellation. This embodiment will be described below with reference to FIGS. 8-10.

Figure 8:
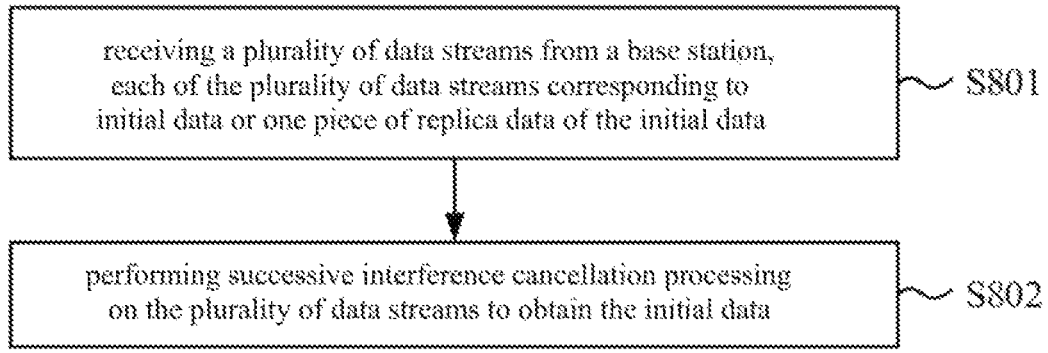
FIG. 8 is a flowchart of a method for signal transmission performed by a user terminal according to another embodiment of the present disclosure.

First, a method for signal transmission performed by a user terminal according to another embodiment of the present disclosure will be described with reference to FIG. 8. FIG. 8 is a flowchart of a method 800 for signal transmission performed by a user terminal according to another embodiment of the present disclosure. As shown in FIG. 8, in step S801, the user terminal receives a plurality of data streams from the base station, and each of the plurality of data streams corresponds to initial data or one piece of replica data of the initial data. In the present disclosure, the replica data of the initial data is the same as the initial data.

According to one example of the present disclosure, the user terminal may receive the plurality of data streams on one or more antenna ports. For example, the user terminal may receive one data stream on each antenna port. For another example, the user terminal may receive a plurality of data streams on one antenna port.

According to another example of the present disclosure, the plurality of data streams may be generated by the base station processing the initial data or one or more pieces of replica data of the initial data, respectively. For example, the plurality of data streams may be generated by the base station performing precoding processing (e.g., through non-linear precoding, etc.) on the initial data or one or more pieces of replica data of the initial data. Non-linear precoding, such as THP, includes modulo operation, feedback processing, feedforward processing, power normalization, and so on.

According to another example of the present disclosure, the plurality of data streams may be transmitted by the base station on at least one DMRS port. For example, when the base station transmits the plurality of data streams on one DMRS port, the plurality of data streams may be transmitted after the base station rotates the plurality of data streams with different phases from each other. For another example, when the base station transmits the plurality of data streams on a plurality of DMRS ports, the plurality of data streams may be transmitted by the base station on different DMRS ports, respectively.

In this example, the user terminal may determine on which DMRS ports the base station transmits the data streams according to control information received from the base station. For example, the user terminal may determine on which DMRS ports the base station transmits the data streams according to RRC signaling, DCI, MAC CEs or the like from the base station.

Then, in step S802, the user terminal performs successive interference cancellation processing on the plurality of data streams to obtain the initial data. For example, the user terminal may perform successive interference cancellation processing on the plurality of data streams by using a Minimum-Mean-Square-Error (MMSE) receiver to obtain the initial data.

In addition, in the case where the plurality of data streams in step S801 are generated by the base station respectively performing precoding processing (e.g., through non-linear precoding, etc.) on the initial data or one or more pieces of replica data of the initial data, according to one example of the present disclosure, before step S802, the method 800 may further include: estimating, by the user terminal, a downlink channel to obtain an estimated channel. For example, when the base station transmits the plurality of data streams on at least one DMRS port, the user terminal may estimate channels corresponding to the at least one DMRS port to obtain an estimated channel corresponding to each DMRS port.

Then, the user terminal may perform an inverse operation of precoding, such as a modulo removal operation, on the data streams through the estimated channel corresponding to each DMRS port. Then, the user terminal may perform successive interference cancellation processing on the data subjected to the inverse operation of precoding to obtain the initial data.

With the above embodiment of the present disclosure, the base station may repeatedly transmit data to be transmitted to the user terminal, and accordingly, the user terminal may perform interference cancellation on received multiple pieces of data to obtain the actual data, thereby reducing interference suffered by the user terminal.

Figure 9:
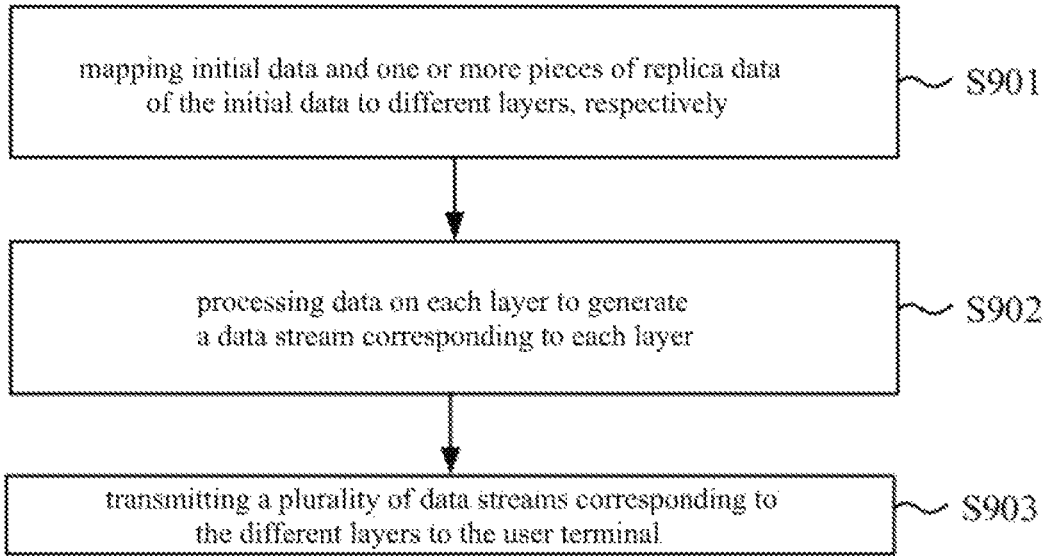
FIG. 9 is a flowchart of a method for signal transmission performed by a base station according to another embodiment of the present disclosure.

A method for signal transmission performed by a base station according to another embodiment of the present disclosure will be described below with reference to FIG. 9. FIG. 9 is a flowchart of a method 900 for signal transmission performed by a base station according to another embodiment of the present disclosure. Since some details of the method 900 is the same as that of the method 800 described above with reference to FIG. 8, a detailed description of the same content is omitted herein for simplicity. As shown in FIG. 9, in step S901, the base station maps initial data and one or more pieces of replica data of the initial data to different layers, respectively. That is, in the present disclosure, each layer corresponds to the initial data or one piece of replica data of the initial data. In addition, in the present disclosure, the replica data of the initial data is the same as the initial data.

Then, in step S902, the base station processes data on each layer to generate a data stream corresponding to each layer. For example, the base station may perform precoding processing on data on each layer (e.g., through non-linear precoding, etc.) to generate a data stream corresponding to each layer. Non-linear precoding herein, such as THP, includes modulo operation, feedback processing, feedforward processing, power normalization, and so on.

An exemplary process in which the base station performs THP on the initial data and one or more pieces of replica data is given below. Assume that in a communication system, there are 1 base station and K user terminals, where each user terminal has $N_{RX,k}$ antenna ports. For the k-th user terminal, the number of layers scheduled by the base station for the k-th user terminal is $L_k$, where k≤K and is a positive integer. In addition, for the k-th user terminal, a data symbol of the l-th layer scheduled to the k-th user terminal is $d_{k,l}$ (l=1, . . . , $L_k$), and the data symbol after repetition may be determined as $d'_{k,l}$ (l=1, . . . , $N_{RX,k}$) in accordance with the layer repetition rule shown in the following formula (2):

$$d'_{k,l} = d_{k,(l \bmod L_k)} (l=1, \ldots, N_{RX,k}) \quad \text{Formula (2)}$$

Moreover, in this case, only $L_k$ needs to be notified. In addition, an element of a feedback matrix B corresponding to interference of the n-th layer of the m-th user terminal to the l-th layer of the k-th user terminal is $b_{k,l,m,n}$. Therefore, for the k-th user terminal, THP precoding processing is implemented by the following formula (3) to obtain a data symbol $x'_{k,l}$ after preprocessing:

$$x'_{k,l} = d'_{k,l} + 2\sqrt{M}(p_I + jp_Q) - \sum_{m=1}^{k-1} \sum_{n=1}^{N_{RX,m}} b_{k,l,m,n} x'_{m,n} - \sum_{n=1}^{l-1} b_{k,l,k,n} x'_{k,n} \quad \text{Formula (3)}$$

where α is a modulus boundary, $p_I$, $p_Q$ are integers, $\sum_{m=1}^{k-1} \sum_{n=1}^{N_{RX,m}} b_{k,l,m,n} x'_{m,n}$ represents interference suffered by the k-th user terminal from other user terminals, and $\sum_{n=1}^{l-1} b_{k,l,k,n} x'_{k,n}$ represents interference from other layers of the k-th user terminal to the layer.

Then, in step S903, the base station transmits a plurality of data streams corresponding to the different layers to the user terminal, so that the user terminal performs successive interference cancellation processing on the plurality of data streams to obtain the initial data.

According to one example of the present disclosure, the base station may transmit the plurality of data streams on at least one DMRS port. For example, when the base station transmits the plurality of data streams on one DMRS port, the base station may transmit the plurality of data streams after rotating the plurality of data streams with different phases from each other. For another example, when the base station transmits the plurality of data streams on a plurality of DMRS ports, the base station may transmit on different DMRS ports, respectively.

In this example, the base station may transmit control information to the user terminal to notify the user terminal of DMRS ports on which the base station transmits downlink data signals. For example, the base station may notify the user terminal of DMRS ports on which the base station transmits downlink data signals through RRC signaling, DCI, MAC CEs or the like.

In addition, in this example, the base station may also transmit control information to the user terminal to notify the user terminal of a correspondence between the number of DMRS ports and the number of layers. In a conventional communication system, there is a one-to-one correspondence between the number of DMRS ports and the number of layers. However, in the present disclosure, the number of DMRS ports and the number of layers are not necessarily in a one-to-one correspondence. Therefore, in this case, the base station may transmit RRC signaling, DCI, MAC CEs or the like to the user terminal to notify the user terminal of the correspondence between the number of DMRS ports and the number of layers.

In addition, in this example, the base station may also reorder data streams corresponding to respective layers. For example, the base station may reorder the data streams corresponding to respective layers based on a principle of fairness. Then, the base station transmits the plurality of reordered data streams on at least one DMRS port.

With the above embodiment of the present disclosure, the base station may repeatedly transmit a downlink data signal to be transmitted. Accordingly, the user terminal may perform interference cancellation on received multiple signals to obtain the actual downlink data signal, thereby reducing interference suffered by the user terminal.

Figure 10:
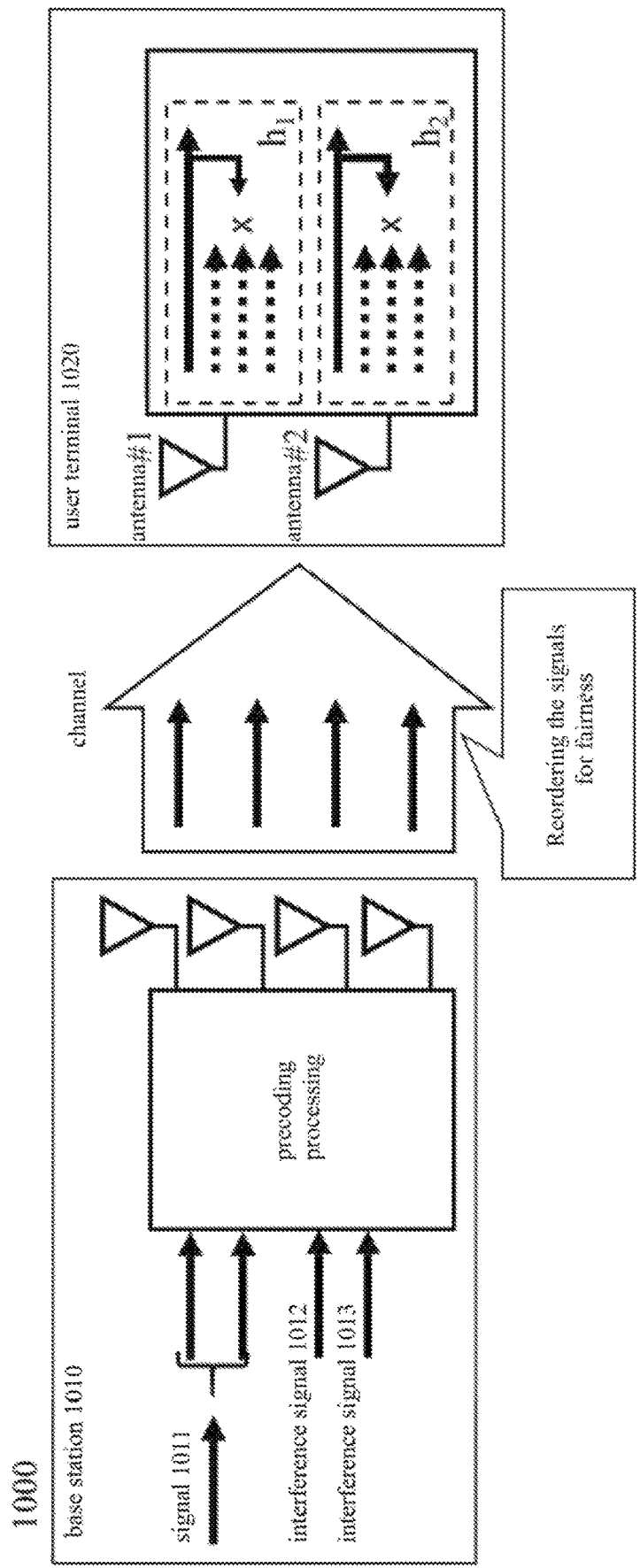
FIG. 10 is a schematic diagram of a wireless communication system that performs signal transmission according to the methods shown in FIGS. 8 and 9.

In addition, a schematic diagram of a wireless communication system that performs signal transmission according to the method 800 shown in FIG. 8 and the method 900 shown in FIG. 9 may be described with reference to FIG. 10. As shown in FIG. 10, a wireless communication system 1000 may include a base station (BS) 1010 and a user terminal 1020, where the base station 1010 is a serving base station of the user terminal 1020. Unlike the prior art (for example, the wireless communication system shown in FIG. 1), since the base station 1010 repeatedly transmits a downlink data signal 1011 to be transmitted, the user terminal 1020 may obtain the actual downlink data signal by performing interference cancellation on two signals received via antenna #1 and antenna #2, thereby reducing interference suffered by the user terminal.

A plurality of embodiments of the present disclosure have been described above, it should be appreciated that the above embodiments may be used alone or in combination. For example, when there is a plurality of user terminals in the communication system, each user terminal may perform any one of the methods performed by a user terminal described in the forgoing plurality of embodiments.

Figure 11:
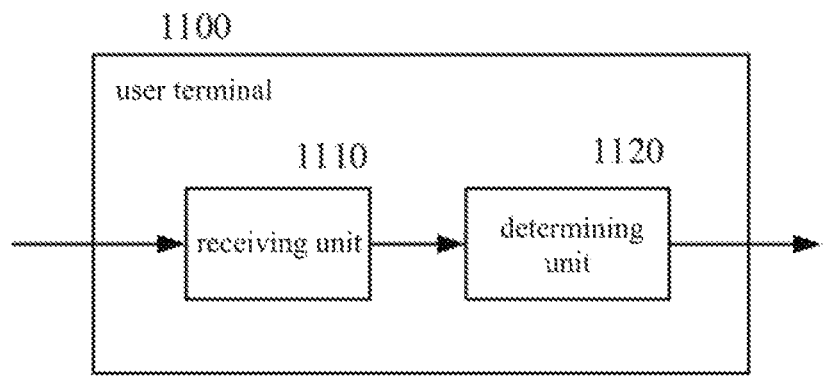
FIG. 11 is a schematic structural diagram of a user terminal that performs the method shown in FIG. 2 according to one embodiment of the present disclosure.

A user terminal that performs the method 200 shown in FIG. 2 according to an embodiment of the present disclosure will be described below with reference to FIG. 11. FIG. 11 shows a block diagram of a user terminal 1100 according to an embodiment of the present disclosure. Since functions of the user terminal 1100 is the same as details of the method 200 described above with reference to FIG. 2, a detailed description of the same content is omitted herein for simplicity.

As shown in FIG. 11, the user terminal 1100 includes a receiving unit 1110 configured to receive indication information for a spatial-domain reception parameter transmitted by a base station; and a determining unit 1120 configured to determine a first spatial-domain reception parameter according to the indication information for a spatial-domain reception parameter, so that the user terminal receives downlink data signals through the first spatial-domain receiving parameter. In addition to these two units, the user terminal 1100 may further include other components, however, since these components are irrelevant to the content of the embodiments of the present disclosure, illustration and description thereof are omitted herein.

In the present disclosure, for example, the indication information for a spatial-domain reception parameter may be indication information generated accordingly by the base station upon the user terminal notifies the base station of a spatial-domain reception parameter determined by itself. Alternatively, the indication information for a spatial-domain reception parameter may also be indication information generated by the base station according to a spatial-domain reception parameter that the base station determines for the user terminal.

An example where the indication information for a spatial-domain reception parameter is indication information generated accordingly by the base station upon the user terminal notifies the base station of a spatial-domain reception parameter determined by itself will be described below specifically.

According to one example of the present disclosure, in this case, before step S201, the method 200 may further include: determining, by the user terminal, at least one candidate spatial-domain reception parameter by measuring a downlink channel. For example, the user terminal may receive a downlink reference signal from the base station, such as a Channel State Information Reference Signal (CSI-RS), for measurement of downlink information to train spatial-domain reception parameters, thereby determining one or more candidate spatial-domain reception parameters.

After the user terminal determines one or more candidate spatial-domain reception parameters, the user terminal 1100 may further include: a transmitting unit (not shown) configured to transmit uplink reference signals to the base station, respectively, by using the at least one candidate spatial-domain reception parameter, so that the base station determines a first reference signal from at least one uplink reference signal. In this example, the uplink reference signals may be any type of uplink reference signals, such as Sounding Reference Signals (SRSs).

In addition, the base station may generate the indication information for a spatial-domain reception parameter according to the first referent signal. In this example, the indication information for a spatial-domain reception parameter may include information on the first reference signal. Accordingly, the receiving unit 1110 may receive the information on the first reference signal. Then, the determining unit 1120 may determine a spatial-domain reception parameter used when transmitting the first reference signal according to the information on the first reference signal transmitted by the base station, and determine the spatial-domain reception parameter used when transmitting the first reference signal as the first spatial-domain reception parameter for receiving downlink data signals.

In addition, regarding the "information on the first reference signal" in the above example, according to one example of the present disclosure, the information on the first reference signal may include resource information and/or port information (e.g., port indexes) of the first reference signal. The resource information of the first reference signal may be, for example, a resource identifier (ID) used when the user terminal transmits an uplink reference signal to be determined by the base station as the first reference signal, such as a time-frequency resource ID. For example, when transmitting an uplink reference signal to the base station, the user terminal may transmit the resource ID and/or port information of the uplink reference signal to the base station together, so that the base station may feedback, after determining the uplink reference signal as the first reference signal, the resource ID and/or port information of the first reference signal to the user terminal. Therefore, after receiving the resource ID and/or port information of the first reference signal fed back by the base station, the user terminal may determine a spatial-domain reception parameter used when transmitting the first reference signal as a target spatial-domain reception parameter.

According to another example of the present disclosure, the information on the first reference signal may further include correlation information between the first reference signal and the downlink reference signal. The "downlink reference signal" herein may be any type of downlink reference signal, such as a Demodulation Reference Signal (DM-RS).

In this example, the correlation information between the first reference signal and the downlink reference signal may be included in downlink configuration information received by the user terminal from the base station. The downlink configuration information may be, for example, downlink Transmission Configuration Identification or Quasi Co-Location (QCL) configuration information. For example, the correlation information between the first reference signal and the downlink reference signal may be embodied as adding the resource information and/or port information of the first reference signal to the downlink configuration information, thereby indicating correlation between the first reference signal and the downlink reference signal. Therefore, the user terminal may learn the first reference signal determined by the base station for the user terminal through the downlink configuration information, and then determine a spatial-domain reception parameter used when transmitting the first reference signal as the target spatial-domain reception parameter. The downlink configuration information being QCL configuration information will be taken as an example to describe the present disclosure.

For example, the resource information and/or port information of the first reference signal may be added to conventional QCL configuration information. The conventional QCL configuration information already includes information indicating correlation between a CSI-RS, a Synchronization Signal (SS) block or the like and the downlink reference signal. In this example, the resource ID and/or port information of the first reference signal may be added to the conventional QCL configuration information to indicate the correlation between the first reference signal and the downlink reference signal. An example of the QCL configuration information is given below:

```
QCL-Info ::= SEQUENCE {
    ...
    referenceSIgnal CHOICE {
        ......
        srs    SRS-ResourceId,
    }
}
```

In this example, the QCL configuration information may be abbreviated as "QCL-Info". In addition, a type of the QCL configuration information may be the Type-D (Type-D) defined in existing standard specifications, that is, a spatial-domain reception parameter used for transmission configuration indication for the resource information and/or port information of the first reference signal.

For another example, a new type of QCL configuration information that is different from the conventional QCL configuration information may be designed. The new type of QCL configuration information may only indicate the correlation between the first reference signal and the downlink reference signal, but not indicate correlation between a CSI-RS, a SS block or the like and the downlink reference signal. For example, the new type of QCL configuration information may include the resource information and/or port information of the first reference signal to indicate the correlation between the first reference signal and the downlink reference signal. An example of the new type of QCL configuration information is given below:

```
QCL-UL-Info ::= SEQUENCE {
    cell ServCellIndex
    bwp-Id BWP-Id
    referenceSignal CHOICE {
        srs    SRS-ResourceId,
    },
    qcl-Type        ENUMERATED {typeA, typeB, typeC, typeD},
}
```

In this example, the new type of QCL configuration information may be abbreviated as "QCL-UL-Info". In addition, the type of the QCL configuration information may be any of the type A (Type-A), type B (Type-B), type C (Type-C) or type D (Type-D) defined in existing standard specifications.

With the above conventional QCL configuration information or newly designed QCL configuration information, the user terminal may determine that the first reference signal is correlated with the downlink reference signal, and then may determine a spatial-domain reception parameter used when transmitting the first reference signal as the first spatial-domain reception parameter for receiving downlink data signals.

It should be appreciated that the above conventional QCL configuration information or newly designed QCL configuration information may further include other information in addition to information indicating correlation between a certain signal and the downlink reference signal, and such other information is omitted herein since it is irrelevant to the present disclosure.

In addition, according to one example of the present disclosure, the receiving unit 1110 may receive the downlink configuration information through Radio Resource Control (RRC) signaling, Downlink Control Information (DCI), Media Access Control (MAC) Control Elements (CEs) or the like from the base station, so as to determine the first spatial-domain reception parameter for receiving downlink data signals according to the downlink configuration information.

In addition, according to another example of the present disclosure, the base station may switch between the conventional QCL configuration information and the newly designed QCL configuration information. Accordingly, the receiving unit 1110 may determine whether to use the conventional QCL configuration information or the newly designed QCL configuration information through RRC signaling, DCI, MAC CEs or the like from the base station, to determine the first spatial-domain reception parameter for receiving downlink data signals.

The example where the indication information for a spatial-domain reception parameter is indication information generated accordingly by the base station upon the user terminal notifies the base station of a spatial-domain reception parameter determined by itself has been described above. An example where the indication information for a spatial-domain reception parameter is indication information generated by the base station according to a spatial-domain reception parameter that the base station determines for the user terminal will be described below specifically.

According to one example of the present disclosure, in this case, the "indication information for a spatial-domain reception parameter" may include index information for the first spatial-domain reception parameter. Accordingly, the determining unit 1120 may determine the first spatial-domain reception parameter for receiving downlink data signals according to the received index information for the first spatial-domain reception parameter.

For example, both the user terminal and the base station may store a codebook corresponding to spatial-domain reception parameters in advance, and then the base station may select the first spatial-domain reception parameter from the codebook and transmit index information for the first spatial-domain reception parameter to the user terminal. The "codebook" may be, for example, any codebook corresponding to spatial-domain reception parameters, such as a codebook already defined in Release 8 or other versions of 3GPP. Accordingly, the receiving unit 1110 receives the index information for the first spatial-domain reception parameter transmitted by the base station. Then, the determining unit 1120 may determine the first spatial-domain reception parameter for receiving downlink data signals in the codebook according to the index information.

In addition, according to one example of the present disclosure, the index information for the first spatial-domain reception parameter may be transmitted to the user terminal by the base station through RRC signaling, DCI, MAC CEs or the like. Accordingly, the receiving unit 1110 may obtain the index information for the first spatial-domain reception parameter by receiving the RRC signaling, the DCI, the MAC CEs or the like from the base station, so as to determine the first spatial-domain reception parameter for receiving downlink data signals in the codebook according to the index information for the first spatial-domain reception parameter.

The above example describes that, when the indication information for a spatial-domain reception parameter is indication information generated by the base station according to a spatial-domain reception parameter that the base station determines for the user terminal, the "indication information for a spatial-domain reception parameter" may include the index information for the first spatial-domain reception parameter. That is, the user terminal may be notified of the first spatial-domain reception parameter by the base station in an implicit manner. In addition, according to another example of the present disclosure, the user terminal may also be notified of the first spatial-domain reception parameter by the base station in an explicit manner.

For example, when the indication information for a spatial-domain reception parameter is indication information generated by the base station according to a spatial-domain reception parameter that the base station determines for the user terminal, the "indication information for a spatial-domain reception parameter" may further include the first spatial-domain reception parameter. Accordingly, the receiving unit 1120 may quickly determine the first spatial-domain reception parameter for receiving downlink data signals according to the received first spatial-domain reception parameter.

With the above embodiment of the present disclosure, the base station may indicate the user terminal to determine a spatial filter for receiving downlink data signals, so that both the base station and the user terminal may agree on the spatial filter for receiving downlink data signals, ensuring that the spatial filter for receiving downlink data signals matches an equivalent channel determined by the base station, thereby reducing interference suffered by the user terminal.

Figure 12:
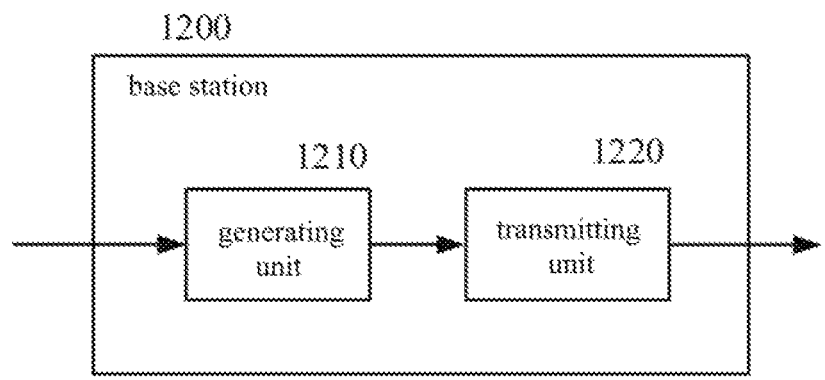
FIG. 12 is a schematic structural diagram of a base station that performs the method shown in FIG. 3 according to one embodiment of the present disclosure.

A base station that performs the method 300 shown in FIG. 3 according to an embodiment of the present disclosure will be described below with reference to FIG. 12. FIG. 12 shows a block diagram of a base station 1200 according to an embodiment of the present disclosure. Since functions of the base station 1200 is the same as details of the method 300 described above with reference to FIG. 3, a detailed description of the same content is omitted herein for simplicity.

As shown in FIG. 12, the base station includes: a generating unit 1210 configured to generate indication information for a spatial-domain reception parameter; and a transmitting unit 1220 configured to transmit the indication information for a spatial-domain reception parameter to a user terminal, so that the user terminal determines a first spatial-domain reception parameter according to the indication information for a spatial-domain reception parameter. In addition to these two units, the base station 1200 may further include other components, however, since these components are irrelevant to the content of the embodiments of the present disclosure, illustration and description thereof are omitted herein.

An example where the indication information for a spatial-domain reception parameter is indication information generated accordingly by the base station upon the user terminal notifies the base station of a spatial-domain reception parameter determined by itself will be described below specifically.

According to one example of the present disclosure, in this case, the base station 1200 may further include: a receiving unit (not shown) configured to receive at least one uplink reference signal from the user terminal, the at least one uplink reference signal being transmitted by the user terminal to the base station, respectively, by using at least one candidate spatial-domain reception parameter; and a selecting unit (not shown) configured to select a first reference signal from the at least one uplink reference signal. For example, the selecting unit may select the first reference signal according to reception quality of the at least one uplink reference signal, for example, the selecting unit may determine an uplink reference signal with the best reception quality as the first reference signal.

In this example, after selecting the first reference signal, the selecting unit may determine, according to the first reference signal, an equivalent channel for transmitting downlink data signals to the user terminal. Moreover, the base station may generate the indication information for a spatial-domain reception parameter according to information of the first reference signal, and transmit the indication information for a spatial-domain reception parameter to the user terminal.

In addition, regarding the "information on the first reference signal" in the above example, according to one example of the present disclosure, the information on the first reference signal may include resource information and/or port information (e.g., port indexes) of the first reference signal. The resource information of the first reference signal may be, for example, a resource identifier (ID) used when the user terminal transmits an uplink reference signal to be determined by the base station as the first reference signal, such as a time-frequency resource ID.

According to another example of the present disclosure, the information on the first reference signal may further include correlation information between the first reference signal and a downlink reference signal. The "downlink reference signal" herein may be any type of downlink reference signal, such as a Demodulation Reference Signal (DM-RS).

In this example, the correlation information between the first reference signal and the downlink reference signal may be included in downlink configuration information received by the user terminal from the base station. The downlink configuration information may be, for example, downlink Transmission Configuration Identification or Quasi Co-Location (QCL) configuration information. For example, the correlation information between the first reference signal and the downlink reference signal may be embodied as adding the resource information and/or port information of the first reference signal to the downlink configuration information, thereby indicating correlation between the first reference signal and the downlink reference signal.

According to one example of the present disclosure, in this case, the "indication information for a spatial-domain reception parameter" may include index information for the first spatial-domain reception parameter. That is, the user terminal may be notified of the first spatial-domain reception parameter by the base station in an implicit manner.

In addition, according to another example of the present disclosure, the user terminal may also be notified of the first spatial-domain reception parameter by the base station in an explicit manner. For example, when the indication information for a spatial-domain reception parameter is indication information generated by the base station according to a spatial-domain reception parameter that the base station determines for the user terminal, the "indication information for a spatial-domain reception parameter" may further include the first spatial-domain reception parameter. Accordingly, the user terminal may quickly determine the first spatial-domain reception parameter for receiving downlink data signals according to the received first spatial-domain reception parameter.

In addition, according to one example of the present disclosure, the transmitting unit 1220 may transmit the indication information for a spatial-domain reception parameter to the user terminal through RRC signaling, DCI, MAC CEs or the like. Accordingly, the user terminal may obtain the index information for the first spatial-domain reception parameter by receiving the RRC signaling, the DCI, the MAC CEs or the like from the base station, so as to determine the first spatial-domain reception parameter for receiving downlink data signals in the codebook according to the index information for the first spatial-domain reception parameter.

In addition, according to one example of the present disclosure, the base station 1200 may further include a processing unit configured to perform precoding processing on downlink data signals, and transmitting the downlink data signals after precoding processing to the user terminal. For example, the base station may perform non-linear precoding processing on the downlink data signals, for example, by using the Tomlinson-Harashima Precoding (THP) scheme or the Vector Perturbation (VP) scheme.

With the above embodiment of the present disclosure, the base station may indicate the user terminal to determine a spatial filter for receiving downlink data signals, so that both the base station and the user terminal may agree on the spatial filter for receiving downlink data signals, ensuring that the spatial filter for receiving downlink data signals matches the equivalent channel determined by the base station, thereby reducing interference suffered by the user terminal.

Figure 13:
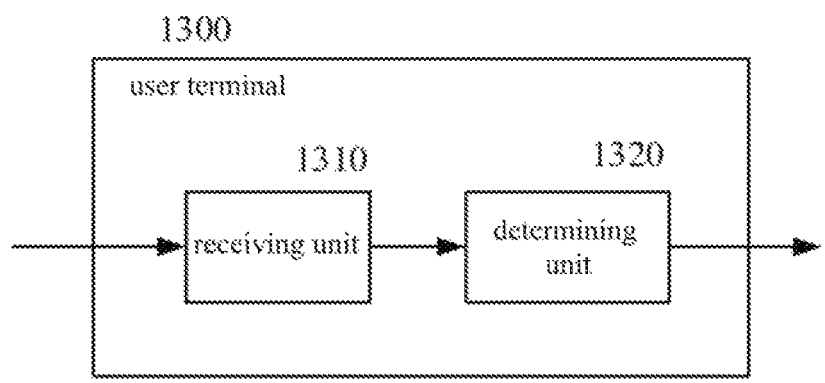
FIG. 13 is a schematic structural diagram of a user terminal that performs the method shown in FIG. 5 according to another embodiment of the present disclosure.

A user terminal that performs the method 500 shown in FIG. 5 according to an embodiment of the present disclosure will be described below with reference to FIG. 13. FIG. 13 shows a block diagram of a user terminal 1300 according to an embodiment of the present disclosure. Since functions of the user terminal 1300 is the same as details of the method 500 described above with reference to FIG. 5, a detailed description of the same content is omitted herein for simplicity.

As shown in FIG. 13, the user terminal includes: a receiving unit 1310 configured to receive information on a first antenna port from a base station; and a determining unit 1320 configured to determine a first antenna port from at least one antenna port of the user terminal according to the information on the first antenna port. In addition, the receiving unit is further configured to receive a first downlink data signal on the first antenna port and ignore a second downlink data signal received on an antenna port of the at least one antenna port except the first antenna port. In addition to the unit, the user terminal 1300 may further include other components, however, since these components are irrelevant to the content of the embodiments of the present disclosure, illustration and description thereof are omitted herein.

According to one example of the present disclosure, the first antenna port may be determined by the base station from the at least one antenna port of the user terminal. For example, the first antenna port may be determined by: the user terminal transmitting an uplink reference signal, such as an SRS, to the base station, and then the base station determining channel conditions corresponding to the at least one antenna port of the user terminal according to the received SRS and determining the first antenna port from the at least one antenna port of the user terminal according to the channel conditions. For example, the first antenna port may be determined by the base station by comparing channel conditions corresponding to respective antenna ports of the user terminal, and selecting an antenna port with the best channel condition.

According to one example of the present disclosure, the information on the first antenna port may include index information for the first antenna port. For example, both the user terminal and the base station may store an antenna port selection codebook in advance, and then the base station may select the first antenna port from the antenna port selection codebook, and transmit the index information for the first antenna port to the user terminal. Accordingly, after receiving the index information for the first antenna port, the user terminal may determine the first antenna port in the antenna port selection codebook according to the index information.

According to another example of the present disclosure, the information on the first antenna port may include correlation information between the first antenna port and the uplink reference signal. In this example, the uplink reference signal may be any type of uplink reference signal, such as a Sounding Reference Signal (SRS). For example, the first antenna port may be set to be QCLed with an SRS port, and therefore, when the user terminal receives the correlation information, an antenna port that is QCLed with the SRS port may be determined as the first antenna port. In addition, the "correlation information between the first antenna port and the uplink reference signal" in this example may also be configured in a similar manner to the QCL configuration information described above, and then transmitted by the base station to the user terminal.

According to another example of the present disclosure, the information on the first antenna port may further include correlation information between the first antenna port and an index of the first antenna port. For example, the first antenna port may be set to be QCLed with the index of the first antenna port, and therefore, when the user terminal receives the correlation information, an antenna port that is QCLed with the index of the first antenna port may be determined as the first antenna port. In addition, the "correlation information between the first antenna port and an index of the first antenna port" in this example may also be configured in a similar manner to the QCL configuration information described above, and then transmitted by the base station to the user terminal.

In addition, according to one example of the present disclosure, the information on the first antenna port may be transmitted by the base station to the user terminal through RRC signaling, DCI, MAC CEs or the like. Accordingly, the user terminal may obtain the information on the first antenna port by receiving the RRC signaling, the DCI, the MAC CEs or the like from the base station, so that the user terminal receives downlink data signals on the first antenna port and discards downlink data signals received on antenna ports of the at least one antenna port except the first antenna port.

According to one example of the present disclosure, when the information on the first antenna port is the index information for the first antenna port, after the receiving unit 1310 receives the index information for the first antenna port, the determining unit 1320 may determine the first antenna port in the antenna port selection codebook according to the index information. For another example, when the information on the first antenna port is the correlation information between the first antenna port and the uplink reference signal or the index of the first antenna port, after the receiving unit 1310 receives the correlation information, the determining unit 1320 may determine an antenna port correlated with the uplink reference signal or the index of the first antenna port as the first antenna port.

With the above embodiment of the present disclosure, the base station may determine a first antenna port from at least one antenna port for the user terminal and notify the user terminal of the first antenna port, and the user terminal only processes downlink data on the first antenna port, so that the first antenna port matches an equivalent channel determined by the base station, thereby reducing interference suffered by the user terminal.

Figure 14:
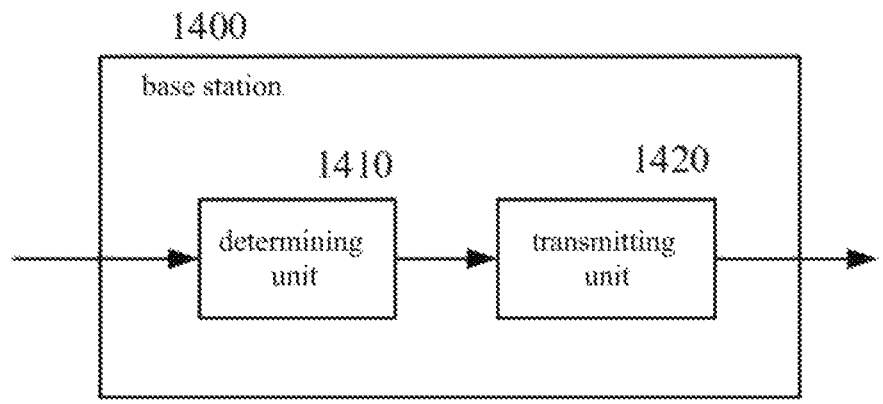
FIG. 14 is a schematic structural diagram of a base station that performs the method shown in FIG. 6 according to another embodiment of the present disclosure.

A base station that performs the method 600 shown in FIG. 6 according to an embodiment of the present disclosure will be described below with reference to FIG. 14. FIG. 14 shows a block diagram of a base station 1400 according to an embodiment of the present disclosure. Since functions of the base station 1400 is the same as details of the method 600 described above with reference to FIG. 6, a detailed description of the same content is omitted herein for simplicity.

As shown in FIG. 14, the base station 1410 includes: a determining unit 1410 configured to determine a first antenna port from at least one antenna port of the user terminal; and a transmitting unit 1420 configured to transmits information on the first antenna port to the user terminal, so that the user terminal receives a first downlink data signal on the first antenna port and ignores a second downlink data signal received on an antenna port of the at least one antenna port except the first antenna port. In addition to these two units, the base station 1400 may further include other components, however, since these components are irrelevant to the content of the embodiments of the present disclosure, illustration and description thereof are omitted herein.

According to one example of the present disclosure, the determining unit 1410 may determine the first antenna port from the at least one antenna port of the user terminal according to channel conditions corresponding to the at least one antenna port of the user terminal. For example, the determining unit 1410 may compare channel conditions corresponding to respective antenna ports of the user terminal, and select therefrom an antenna port with the best channel condition as the first antenna port.

According to one example of the present disclosure, the information on the first antenna port may include index information for the first antenna port. For example, both the user terminal and the base station may store an antenna port selection codebook in advance, and then the base station may select the first antenna port from the antenna port selection codebook, and transmit the index information for the first antenna port to the user terminal. Accordingly, after receiving the index information for the first antenna port, the user terminal may determine the first antenna port in the antenna port selection codebook according to the index information.

In this example, for a user terminal having a specific number of antenna ports, one or more codebooks corresponding to the specific number of antenna ports may be set. In addition, the number of bits of the one or more codebooks may be determined according to the specific number of antenna ports of the user terminal.

For example, for a user terminal having two antenna ports, the user terminal may receive downlink data signals by using at least one of the two antenna ports. When RI (Rank Indication) is 1, the user terminal may receive downlink data signals by using any one of the two antenna ports (two usage modes of the ports); and when RI is 2, the user terminal may receive downlink data signals by using the two antenna ports (one usage mode of the ports). Therefore, there are three usage modes of the ports for the user terminal having two antenna ports, and one antenna port selection codebook represented by two bits may be set.

According to another example of the present disclosure, the information on the first antenna port may include correlation information between the first antenna port and an uplink reference signal. In this example, the uplink reference signal may be any type of uplink reference signal, such as a Sounding Reference Signal (SRS). For example, the first antenna port may be set to be QCLed with an SRS port, and therefore, when the user terminal receives the correlation information, an antenna port that is QCLed with the SRS port may be determined as the first antenna port. In addition, the "correlation information between the first antenna port and an uplink reference signal" in this example may also be configured in a similar manner to the QCL configuration information described above, and then transmitted by the base station to the user terminal.

According to another example of the present disclosure, the information on the first antenna port may further include correlation information between the first antenna port and an index of the first antenna port. For example, the first antenna port may be set to be QCLed with the index of the first antenna port, and therefore, when the user terminal receives the correlation information, an antenna port that is QCLed with the index of the first antenna port may be determined as the first antenna port. In addition, the "correlation information between the first antenna port and an index of the first antenna port" in this example may also be configured in a similar manner to the QCL configuration information described above, and then transmitted by the base station to the user terminal.

In addition, according to one example of the present disclosure, the information on the first antenna port may be transmitted by the base station to the user terminal through RRC signaling, DCI, MAC CEs or the like. Accordingly, the user terminal may obtain the information on the first antenna port by receiving the RRC signaling, the DCI, the MAC CEs or the like from the base station, so that the user terminal receives the first downlink data signal on the first antenna port according to the information on the first antenna port and discards the second downlink data signal received on an antenna port of the at least one antenna port except the first antenna port.

In addition, according to one example of the present disclosure, the base station 1400 may further include a processing unit (not shown) configured to perform precoding processing on the downlink data signals. Then, the transmitting unit 1420 transmits the downlink data signals after precoding processing to the user terminal. For example, the base station may perform non-linear precoding processing on the downlink data signals, for example, by using the Tomlinson-Harashima Precoding (THP) scheme or the Vector Perturbation (VP) scheme. For example, the base station may perform THP coding on the downlink data signals by using the formula (1) described above.

With the above embodiment of the present disclosure, the base station may determine a first antenna port from at least one antenna port for the user terminal and notify the user terminal of the first antenna port, and the user terminal only processes downlink data signals on the first antenna port, so that the first antenna port matches an equivalent channel determined by the base station, thereby reducing interference suffered by the user terminal.

Figure 15:
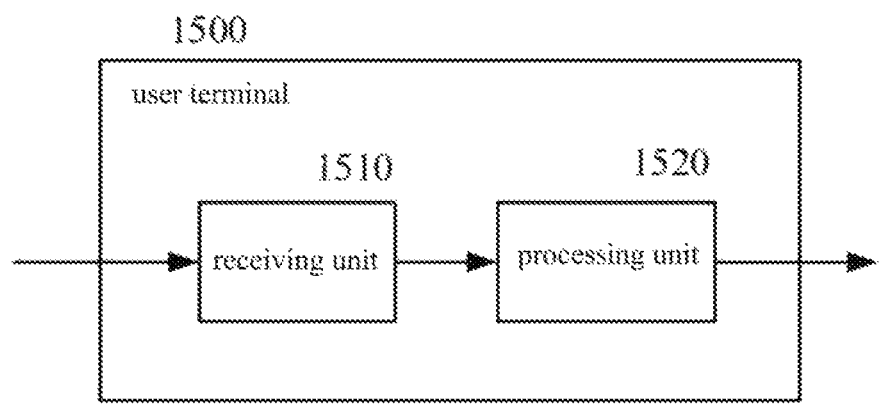
FIG. 15 is a schematic structural diagram of a user terminal that performs the method shown in FIG. 8 according to another embodiment of the present disclosure.

A user terminal that performs the method 800 shown in FIG. 8 according to an embodiment of the present disclosure will be described below with reference to FIG. 15. FIG. 15 shows a block diagram of a user terminal 1500 according to an embodiment of the present disclosure. Since functions of the user terminal 1500 is the same as details of the method 800 described above with reference to FIG. 8, a detailed description of the same content is omitted herein for simplicity.

As shown in FIG. 15, the user terminal 1500 includes a receiving unit 1510 configured to receive a plurality of data streams from a base station, each of the plurality of data streams corresponding to initial data or one piece of replica data of the initial data; and a processing unit 1520 configured to perform successive interference cancellation processing on the plurality of data streams to obtain the initial data. In addition to these two units, the user terminal 1500 may further include other components, however, since these components are irrelevant to the content of the embodiments of the present disclosure, illustration and description thereof are omitted herein.

According to one example of the present disclosure, the receiving unit 1510 may receive the plurality of data streams on one or more antenna ports. For example, the user terminal may receive one data stream on each antenna port. For another example, the user terminal may receive a plurality of data streams on one antenna port.

According to another example of the present disclosure, the plurality of data streams may be generated by the base station processing the initial data or one or more pieces of replica data of the initial data, respectively. For example, the plurality of data streams may be generated by the base station performing precoding processing (e.g., through non-linear precoding, etc.) on the initial data or one or more pieces of replica data of the initial data. Non-linear precoding, such as THP, includes modulo operation, feedback processing, feedforward processing, power normalization, and so on.

According to another example of the present disclosure, the plurality of data streams may be transmitted by the base station on at least one DMRS port. For example, when the base station transmits the plurality of data streams on one DMRS port, the plurality of data streams may be transmitted after the base station rotates the plurality of data streams with different phases from each other. For another example, when the base station transmits the plurality of data streams on a plurality of DMRS ports, the plurality of data streams may be transmitted by the base station on different DMRS ports, respectively.

In this example, the receiving unit 1510 may determine on which DMRS ports the base station transmits the data streams according to control information received from the base station. For example, the user terminal may determine on which DMRS ports the base station transmits the data streams according to RRC signaling, DCI, MAC CEs or the like from the base station.

According to one example of the present disclosure, the processing unit 1520 may perform successive interference cancellation processing on the plurality of data streams by using a Minimum-Mean-Square-Error (MMSE) receiver to obtain the initial data.

In addition, in the case where the plurality of data streams are generated by the base station performing precoding processing (e.g., through non-linear precoding, etc.) on the initial data or one or more pieces of replica data of the initial data, according to one example of the present disclosure, the user terminal 1500 may further include a channel estimating unit (not shown) configured to estimate a downlink channel to obtain an estimated channel. For example, when the base station transmits the plurality of data streams on at least one DMRS port, the channel estimating unit may estimate channels corresponding to the at least one DMRS port to obtain an estimated channel corresponding to each DMRS port.

Then, the processing unit 1520 may perform an inverse operation of precoding, such as a modulo removal operation, on the data streams through the estimated channel corresponding to each DMRS port. Then, the processing unit 1520 may perform successive interference cancellation processing on the data subjected to the inverse operation of precoding to obtain the initial data.

With the above embodiment of the present disclosure, the base station may repeatedly transmit data to be transmitted to the user terminal, and accordingly, the user terminal may perform interference cancellation on received multiple pieces of data to obtain the actual data, thereby reducing interference suffered by the user terminal.

Figure 16:
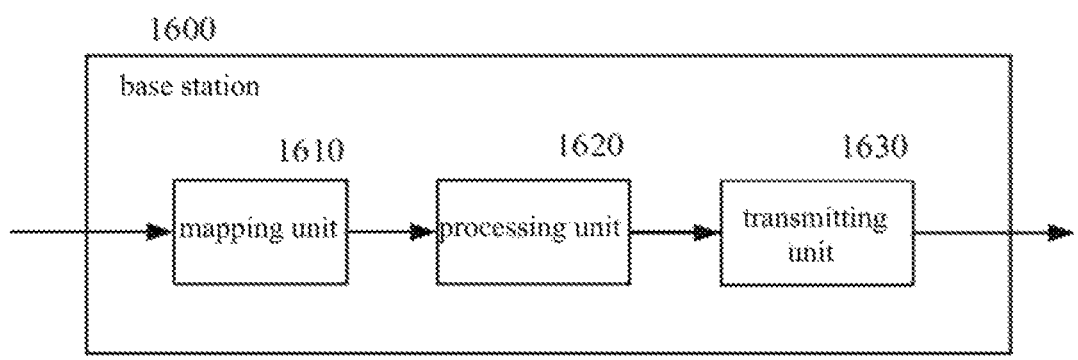
FIG. 16 is a schematic structural diagram of a base station that performs the method shown in FIG. 9 according to another embodiment of the present disclosure.

A base station that performs the method 900 shown in FIG. 9 according to an embodiment of the present disclosure will be described below with reference to FIG. 16. FIG. 16 shows a block diagram of a base station 1600 according to an embodiment of the present disclosure. Since functions of the base station 1600 is the same as details of the method 900 described above with reference to FIG. 9, a detailed description of the same content is omitted herein for simplicity.

As shown in FIG. 16, the base station 1600 includes: a mapping unit 1610 configured to map initial data and one or more pieces of replica data of the initial data to different layers, respectively; a processing unit 1620 configured to process data on each layer to generate a data stream corresponding to each layer; and a transmitting unit 1630 configured to transmit a plurality of data streams corresponding to different layers to the user terminal, so that the user terminal performs successive interference cancellation processing on the plurality of data streams to obtain the initial data. In addition to these three units, the base station 1600 may further include other components, however, since these components are irrelevant to the content of the embodiments of the present disclosure, illustration and description thereof are omitted herein.

According to one example of the present disclosure, the processing unit 1620 may perform precoding processing on data on each layer (e.g., through non-linear precoding, etc.) to generate a data stream corresponding to each layer. Non-linear precoding herein, such as THP, includes modulo operation, feedback processing, feedforward processing, power normalization, and so on.

According to one example of the present disclosure, the transmitting unit 1630 may transmits the plurality of data streams on at least one DMRS port. For example, when the base station transmits the plurality of data streams on one DMRS port, the transmitting unit 1630 may transmit the plurality of data streams after rotating the plurality of data streams with different phases from each other. For another example, when the base station transmits the plurality of data streams on a plurality of DMRS ports, the transmitting unit 1630 may transmit on different DMRS ports, respectively.

In this example, the transmitting unit 1630 may transmit control information to the user terminal to notify the user terminal of DMRS ports on which the base station transmits downlink data signals. For example, the transmitting unit 1630 may notify the user terminal of DMRS ports on which the base station transmits downlink data signals through RRC signaling, DCI, MAC CEs or the like.

In addition, in this example, the transmitting unit 1630 may also transmit control information to the user terminal to notify the user terminal of a correspondence between the number of DMRS ports and the number of layers. In a conventional communication system, there is a one-to-one correspondence between the number of DMRS ports and the number of layers. However, in the present disclosure, the number of DMRS ports and the number of layers are not necessarily in a one-to-one correspondence. Therefore, in this case, the base station may transmit RRC signaling, DCI, MAC CEs or the like to the user terminal to notify the user terminal of the correspondence between the number of DMRS ports and the number of layers.

In addition, in this example, the transmitting unit 1630 may also reorder data streams corresponding to respective layers. For example, the transmitting unit 1630 may reorder the data streams corresponding to respective layers based on a principle of fairness. Then, the transmitting unit 1630 transmits the plurality of reordered data streams on at least one DMRS port.

With the above embodiment of the present disclosure, the base station may repeatedly transmit a downlink data signal to be transmitted. Accordingly, the user terminal may perform interference cancellation on received multiple signals to obtain the actual downlink data signal, thereby reducing interference suffered by the user terminal.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g., via wire and/or wireless), and the respective functional blocks may be implemented by these apparatuses.

Figure 17:
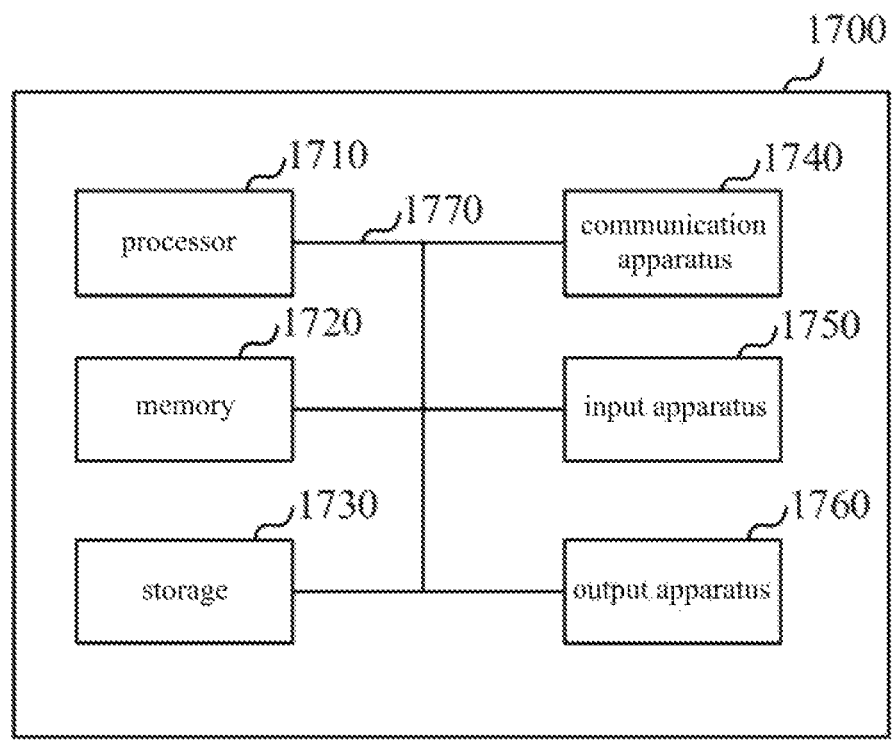
FIG. 17 is a schematic diagram of a hardware structure of a user terminal or a base station involved in the embodiments of the present disclosure.

For example, a base station in one embodiment of the present disclosure (e.g., the first communication device, the second communication device, the aerial user terminal or the like) may function as a computer that performs the processes of the wireless communication method of the present disclosure. FIG. 17 is a schematic diagram of a hardware structure of a device 1700 (a base station or a user terminal) involved in an embodiment of the present disclosure. The above device (the base station or the user terminal) may be constituted as a computer apparatus that physically comprises a processor 1710, a memory 1720, a storage 1730, a communication apparatus 1740, an input apparatus 1750, an output apparatus 1760, a bus 1770 and the like In addition, in the following description, terms such as "apparatus" may be replaced with circuits, devices, units, and the like. Hardware structures of the user terminal and the base station may include one or more of the respective apparatuses shown in the figure, or may not include a part of the apparatuses.

For example, only one processor 1710 is illustrated, but there may be a plurality of processors. Furthermore, processes may be performed by one processor, or processes may be performed by more than one processor simultaneously, sequentially, or by other methods. In addition, the processor 1710 may be installed by more than one chip.

Respective functions of the device 1700 may be implemented, for example, by reading specified software (program) on hardware such as the processor 1710 and the memory 1720, so that the processor 1710 performs computations, controls communication performed by the communication apparatus 1740, and controls reading and/or writing of data in the memory 1720 and the storage 1730.

The processor 1710, for example, operates an operating system to control the entire computer. The processor 1710 may be constituted by a Central Processing Unit (CPU), which includes interfaces with peripheral apparatuses, a control apparatus, a computing apparatus, a register and the like. For example, the determining unit, the adjusting unit and the like described above may be implemented by the processor 1710.

In addition, the processor 1710 reads programs (program codes), software modules and data from the storage 1730 and/or the communication apparatus 1740 to the memory 1720, and execute various processes according to them. As for the program, a program causing computers to execute at least a part of the operations described in the above embodiments may be employed. For example, the determining unit of the user terminal 500 may be implemented by a control program stored in the memory 1720 and operated by the processor 1710, and other functional blocks may also be implemented similarly.

The memory 1720 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 1720 may also be referred to as a register, a cache, a main memory (a main storage apparatus) and the like. The memory 1720 may store executable programs (program codes), software modules and the like for implementing the method involved in one embodiment of the present disclosure.

The storage 1730 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 1730 may also be referred to as an auxiliary storage apparatus.

The communication apparatus 1740 is a hardware (transceiver device) performing communication between computers via a wired and/or wireless network, and is also referred to as a network device, a network controller, a network card, a communication module and the like, for example. The communication device 1740 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 1740.

The input apparatus 1750 is an input device (e.g., a keyboard, a mouse, a microphone, a switch, a button, a sensor and the like) that receives input from the outside. The output apparatus 1760 is an output device (e.g., a display, a speaker, a Light Emitting Diode (LED) light and the like) that performs outputting to the outside. In addition, the input apparatus 1750 and the output apparatus 1760 may also be an integrated structure (e.g., a touch screen).

Furthermore, the respective apparatuses such as the processor 1710 and the memory 1720 are connected by the bus 1770 that communicates information. The bus 1770 may be constituted by a single bus or by different buses between the apparatuses.

Furthermore, the base station and the user terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 1710 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

Furthermore, the information, parameters and so on described in this specification may be represented in absolute values or in relative values with respect to specified values, or may be represented by other corresponding information. For example, radio resources may be indicated by specified indices. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limited in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). A term like "a cell" and "a sector" refers to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions of the first communication device or the second communication device in the device 1700 described above may be regarded as functions provided by the user terminal. In addition, the words "up", "down" and the like may also be replaced with "side". For example, an uplink channel may be replaced with a side channel.

Also, the user terminal in this specification may be replaced with a wireless base station. At this time, functions provided by the above user terminal may be regarded as functions provided by the first communication device or the second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The respective manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 3000, UMB (Ultra Mobile Broadband), IEEE 920.11 (Wi-Fi®), IEEE 920.16 (WiMAX®), IEEE 920.20, UWB (Ultra-WideBand), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A terminal comprising:
    a receiver configured to receive indication information for a spatial-domain reception parameter transmitted by a base station; and
    a processor configured to determine a first spatial-domain reception parameter according to the indication information for a spatial-domain reception parameter, so that the terminal receives downlink data signals through the first spatial-domain reception parameter; and
    a transmitter configured to transmit uplink reference signals to the base station by using at least one candidate spatial-domain reception parameter, respectively, so that the base station determines a first reference signal from the at least one uplink reference signal, wherein the indication information for a spatial-domain reception parameter includes information on the first reference signal.

2. The terminal of claim 1, wherein the processor is configured to determine the at least one candidate spatial-domain reception parameter by measuring a downlink channel.

3. The terminal of claim 1, wherein the information on the first reference signal includes resource information and/or port information of the first reference signal.

4. The terminal of claim 1, wherein the information on the first reference signal includes correlation information between the first reference signal and a downlink reference signal.

5. The terminal of claim 1, wherein the indication information for a spatial-domain reception parameter includes index information for the first spatial-domain reception parameter.

6. The terminal of claim 5, wherein the processor is configured to determine the first spatial-domain reception parameter from a preset codebook according to the index information for the first spatial-domain reception parameter.

7. A base station comprising:
a processor configured to generate indication information for a spatial-domain reception parameter; and
a transmitter configured to transmit the indication information for a spatial-domain reception parameter to a terminal, so that the terminal determines a first spatial-domain reception parameter according to the indication information for a spatial-domain reception parameter; and
a receiver configured to receive at least one uplink reference signal from the terminal, the at least one uplink reference signal being transmitted by the terminal to the base station, respectively, by using at least one candidate spatial-domain reception parameter,
wherein the processor is further configured to select a first reference signal from the at least one uplink reference signal, wherein the indication information for a spatial-domain reception parameter includes information on the first reference signal.

\* \* \* \* \*